United States Patent
Aoyama et al.

(10) Patent No.: US 6,792,924 B2
(45) Date of Patent: Sep. 21, 2004

(54) ENGINE CONTROL SYSTEM OF INTERNAL COMBUSTION ENGINE WITH VARIABLE COMPRESSION RATIO MECHANISM AND EXHAUST-GAS RECIRCULATION CONTROL SYSTEM

(75) Inventors: Shunichi Aoyama, Kanagawa (JP); Shinichi Takemura, Yokohama (JP); Takanobu Sugiyama, Yokohama (JP); Ryosuke Hiyoshi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 130 days.

(21) Appl. No.: 10/290,251

(22) Filed: Nov. 8, 2002

(65) Prior Publication Data

US 2003/0106542 A1 Jun. 12, 2003

(30) Foreign Application Priority Data

Dec. 6, 2001 (JP) .......................... 2001-372188
Apr. 25, 2002 (JP) .......................... 2002-123366

(51) Int. Cl.$^7$ ............................................. F02M 25/07
(52) U.S. Cl. ................. 123/568.14; 123/78 E; 123/78 F; 123/197.4
(58) Field of Search ..................... 123/568.14, 48 B, 123/78 E, 78 F, 197.4

(56) References Cited

U.S. PATENT DOCUMENTS

| | | | |
|---|---|---|---|
| 5,682,854 A | * 11/1997 | Ozawa | 123/568.14 |
| 5,927,236 A | * 7/1999 | Gonzalez | 123/78 F |
| 5,988,125 A | 11/1999 | Hara et al. | |
| 6,125,801 A | * 10/2000 | Mendler | 123/48 R |
| 6,352,057 B1 | * 3/2002 | Drecq | 123/197.3 |
| 6,619,249 B2 | * 9/2003 | Sakuragi et al. | 123/198 F |

FOREIGN PATENT DOCUMENTS

| | | |
|---|---|---|
| JP | 7-259655 A | 10/1995 |
| JP | 11-107725 A | 4/1999 |
| JP | 2000-73804 A | 3/2000 |
| JP | 2001-263099 A | 9/2001 |
| JP | 2001-263113 A | 9/2001 |

* cited by examiner

Primary Examiner—Mahmoud Gimie
Assistant Examiner—Arnold Castro
(74) Attorney, Agent, or Firm—Foley & Lardner LLP

(57) ABSTRACT

A combustion control system for a spark-ignition internal combustion engine includes a variable piston stroke characteristic mechanism changing a compression ratio of the engine, sensors detecting engine operating conditions, i.e., engine speed and engine load, and at least one of a variable lift and working angle control mechanism simultaneously continuously changing an intake-valve lift and an intake-valve working angle and a variable phase control mechanism changing an angular phase at a central angle corresponding to a maximum valve lift point of the intake valve. Also provided is a control unit that controls the variable piston stroke characteristic mechanism, and at least one of the variable lift and working angle control mechanism and the variable phase control mechanism, depending on the engine operating conditions.

20 Claims, 20 Drawing Sheets

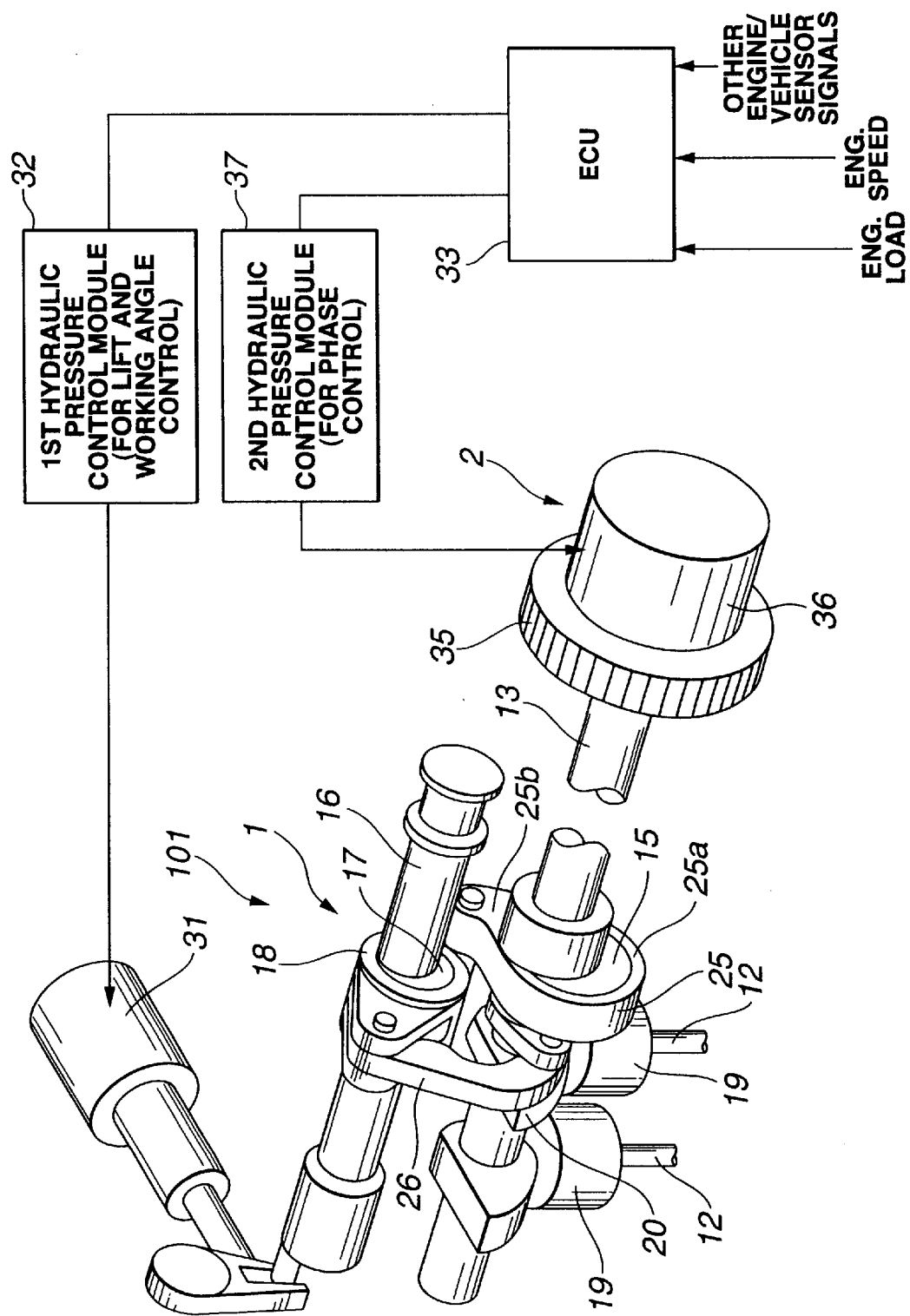

IN HIGH COMPRESSION OPERATING MODE

IN LOW COMPRESSION OPERATING MODE

ENGINE CONTROL SYSTEM OF INTERNAL COMBUSTION ENGINE WITH VARIABLE COMPRESSION RATIO MECHANISM AND EXHAUST-GAS RECIRCULATION CONTROL SYSTEM

TECHNICAL FIELD

The present invention relates to an engine control system of an internal combustion engine with both a variable compression ratio mechanism and an exhaust-gas recirculation (EGR) control system, and specifically to techniques for enhancing fuel economy and engine performance under a part load condition of a spark-ignition internal combustion engine.

BACKGROUND ART

In recent years, there have been proposed and developed various reciprocating internal combustion engines equipped with a variable compression ratio mechanism enabling a nominal compression ratio or a geometrical or mechanical compression ratio denoted by Greek letter $\epsilon$ (epsilon) to be continuously varied depending on engine operating conditions. One such variable compression ratio mechanism has been disclosed in Japanese Patent Provisional Publication No. 2000-73804 (hereinafter is referred to as "JP2000-73804"). In the internal combustion engine of JP2000-73804, a multi-link type piston-crank mechanism is used as a variable compression ratio mechanism. Under a part load condition, compression ratio $\epsilon$ is adjusted to a high compression ratio in order to enhance a thermal efficiency. In contrast, at high loads, compression ratio $\epsilon$ is set or adjusted to as high a ratio as possible, taking into account the frequency of detonation or knock. On the other hand, Japanese Patent Provisional Publication No. 7-259655 (hereinafter is referred to as "JP7-259655") discloses a variable compression ratio engine capable of switching between a standard Otto-cycle operating mode and either one of a so-called early intake-valve closing Miller-cycle operating mode at which the intake valve is closed at approximately 90 degrees of crankangle before BDC on the intake stroke and a so-called late intake-valve closing Miller-cycle operating mode at which the intake valve is closed approximately 90 degrees of crankangle after BDC on the intake stroke. The early intake-valve closing Miller-cycle operating mode and late intake-valve closing Miller-cycle operating mode both contribute to a reduction in effective compression ratio. JP7-259655 teaches lowering an exhaust-gas recirculation rate by switching from the standard Otto-cycle operating mode to the Miller-cycle operating mode. That is, JP7-259655 utilizes switching between the standard Otto-cycle operating mode and the Miller-cycle operating mode instead of using a variable compression ratio mechanism (a multi-link type piston-crank mechanism) as disclosed in JP2000-73804 that variably controls a mechanical compression ratio $\epsilon$.

SUMMARY OF THE INVENTION

In the spark-ignition internal combustion engine disclosed in JP2000-73804 capable of variably controlling a nominal compression ratio (or a mechanical compression ratio $\epsilon$), it is possible to enhance the thermal efficiency by adjusting compression ratio $\epsilon$ to as high a ratio as possible under a part load condition. However, adjustment of the compression ratio to high results in a rise in combustion temperature, thereby increasing cooling loss. Thus, during part loads, a remarkable improvement in fuel economy cannot be achieved, because, on the one hand, the fuel consumption rate tends to reduce due to the enhanced thermal efficiency, and, on the other hand, the fuel consumption rate tends to increase due to the increased cooling loss. In particular, in case of a spark-ignition internal combustion engine employing a variable compression ratio mechanism that mechanical compression ratio $\epsilon$ is variably adjusted by changing a top dead center (TDC) position of a piston stroke characteristic containing both the TDC position and BDC position with the compression ratio adjusted to high, the TDC position tends to extremely approach to the cylinder head in such a manner as to form an excessively flat combustion chamber. Such an excessively flat shape of combustion chamber leads to an increase in a so-called S/V ratio of the surface area existing within the combustion chamber to the volume existing within the combustion chamber, thus increasing cooling loss. As is generally known, in order to improve fuel economy under a part load condition, it is very effective to add exhaust gases recirculated. Such EGR addition contributes to a reduction in cooing loss but leads to the problem of slow combustion velocities. That is, combustion begins at a late timing after TDC. Such a retardation in combustion results in increased time loss. In particular, during the part-load condition, there is a tendency for combustion to occur slowly, and therefore the thermal efficiency tends to remarkably reduce due to the increased time loss. Additionally, a large amount of exhaust gases recirculated causes unstable combustion.

In the same manner, the previously-noted Miller-cycle, employing early intake-valve closing, contributes to a reduction in pumping loss and cooling loss. However, the early intake-valve closing Miller-cycle operating mode also leads to the problem of slow combustion velocities, that is, the increased time loss.

Accordingly, it is an object of the invention to provide an engine control system of an internal combustion engine with a variable compression ratio mechanism and an exhaust-gas recirculation control system, which avoids the aforementioned disadvantages.

It is another object of the invention to avoid problems of increased time loss and unstable combustion, occurring owing to EGR and early intake-valve closing, by properly setting a piston velocity characteristic (linkage layout) of a multi-link type piston-crank mechanism constructing a variable compression ratio mechanism, and to remarkably improve fuel economy under a part load condition by way of an optimal combination of several ways to improve fuel economy, namely compression ratio control, EGR control, engine valve timing control, and improved linkage layout of the multi-link type piston-crank mechanism.

It is a further object of the invention to provide an internal combustion engine with a variable compression ratio mechanism and an exhaust-gas recirculation control system, capable of effectively properly using internal EGR and/or external EGR.

In order to accomplish the aforementioned and other objects of the present invention, an engine control system for an internal combustion engine comprises a variable compression ratio mechanism comprising a multi-link type piston-crank mechanism having a plurality of links and enabling a compression ratio of the engine to be varied by changing a piston stroke characteristic by way of a change in an attitude of apart of the links, an exhaust-gas recirculation system enabling at least one of external EGR and internal EGR to be controlled, the links of the multi-link type piston-crank mechanism being laid out, so that a piston velocity near top dead center, obtained by the multi-link type piston-crank mechanism, is slower than a piston velocity near top dead center, obtained by a single-link type piston-crank mechanism having at least the same piston stroke as the multi-link type piston-crank mechanism, during a part load condition of the engine, the variable compression ratio mechanism controlling the compression ratio to a predetermined high compression ratio, and during the part load condition, the exhaust-gas recirculation system increasing exhaust-gas recirculation.

According to another aspect of the invention, an engine control system for an internal combustion engine comprises a variable compression ratio mechanism comprising a multi-link type piston-crank mechanism having a plurality of links and enabling a compression ratio of the engine to be varied by changing a piston stroke characteristic by way of a change in an attitude of apart of the links, an exhaust-gas recirculation system enabling at least one of external EGR and internal EGR to be controlled, the links of the multi-link type piston-crank mechanism being laid out, so that a maximum piston acceleration near top dead center, obtained by the multi-link type piston-crank mechanism, is less than a maximum piston acceleration near bottom dead center, obtained by the multi-link type piston-crank mechanism, during a part load condition of the engine, the variable compression ratio mechanism controlling the compression ratio to a predetermined high compression ratio, and during the part load condition, the exhaust-gas recirculation system increasing exhaust-gas recirculation.

According to a further aspect of the invention, an engine control system for an internal combustion engine comprises variable compression ratio means comprising a multi-link type piston-crank mechanism having a plurality of links that enable a compression ratio of the engine to be varied by changing a piston stroke characteristic by way of a change in an attitude of a part of the links, exhaust-gas recirculation means for enabling at least one of external EGR and internal EGR to be controlled, the links of the multi-link type piston-crank mechanism being laid out, so that a piston velocity near top dead center, obtained by the multi-link type piston-crank mechanism, is slower than a piston velocity near top dead center, obtained by a single-link type piston-crank mechanism having at least the same piston stroke as the multi-link type piston-crank mechanism, during a part load condition of the engine, the variable compression ratio means controlling the compression ratio to a predetermined high compression ratio, and during the part load condition, the exhaust-gas recirculation means increasing exhaust-gas recirculation. More preferably, the links of the multi-link type piston-crank mechanism may be laid out, so that a maximum piston acceleration near top dead center, obtained by the multi-link type piston-crank mechanism, is less than a maximum piston acceleration near bottom dead center, obtained by the multi-link type piston-crank mechanism.

The other objects and features of this invention will become understood from the following description with reference to the accompanying drawings.

BRIEF DESCRIPTION OF THE DRAWINGS

FIG. 2 is a perspective view illustrating the detailed structure of the variable valve operating mechanism containing both a variable lift and working angle control mechanism and a variable phase control mechanism.

DESCRIPTION OF THE PREFERRED EMBODIMENTS

Figure 1:
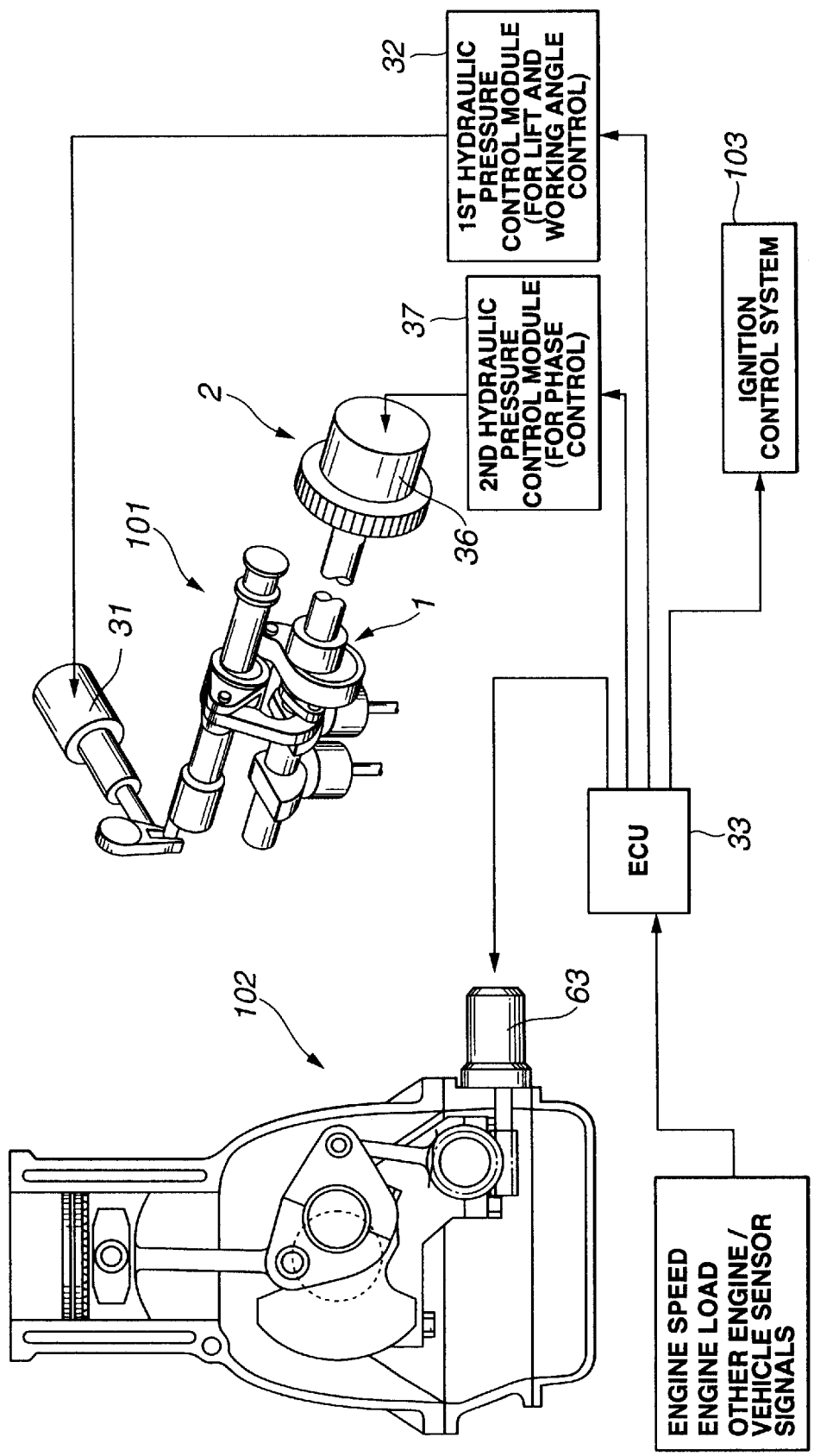
FIG. 1 is a system block diagram illustrating the construction of an internal combustion engine of the embodiment, employing a variable valve operating mechanism and a variable compression ratio mechanism.

Referring now to the drawings, particularly to FIG. 1, the integrated engine control system of the invention is exemplified in an automotive spark-ignition multi-cylinder gasoline engine. The integrated engine control system of the embodiment has three different control mechanisms, namely a variable valve operating mechanism 101, a variable compression ratio mechanism 102, and an electronic ignition-timing control system (an ignition timing advancer) 103. Variable valve operating mechanism 101 is applied to an intake-port valve of engine valves, and provided to variably control an intake valve open timing IVO and an intake valve closure timing IVC, depending on engine operating conditions. Variable compression ratio mechanism 102 is provided to variably control a nominal compression ratio or a geometrical or mechanical compression ratio $\epsilon$ depending on engine operating conditions. Ignition timing advancer 103 is provided to electronically retard or advance the timing of spark. As shown in FIGS. 1 and 2, variable valve operating mechanism 101 is comprised of a variable lift and working angle control mechanism 1 and a variable phase control mechanism 2 combined to each other. Variable lift and working angle control mechanism 1 functions to change (increase or decrease) both a valve lift and a working angle EA of an intake valve 12, depending on engine/vehicle operating conditions. Variable phase control mechanism 2 functions to change (advance or retard) the angular phase at the maximum valve lift point (at the central angle $\phi$). By means of variable valve operating mechanism 101, constructed by variable lift and working angle control mechanism 1 and variable phase control mechanism 2 combined to each other, it is possible to arbitrarily change intake valve open timing IVO and intake valve closure timing IVC independently of each other. In the shown embodiment, an exhaust valve open timing EVO and an exhaust valve closure timing EVC are both fixed. Thus, it is possible to change the magnitude of the valve overlap from intake valve open timing IVO to exhaust valve closure timing EVC by changing intake valve open timing IVO. In addition to the above, by adjusting intake valve closure timing IVC to a timing before the BDC position on intake stroke, it is possible to change the actual compression ratio (an effective compression ratio $\epsilon'$ described later). Additionally, the system of the embodiment utilizes internal EGR as well as external EGR. The external EGR (which will be fully described later in reference to the system block diagram shown in FIG. 14) means exhaust-gas recirculation that is achieved by way of a conventional EGR system whose EGR control valve allows part of exhaust gases to enter the intake manifold (the intake port side). On the other hand, the internal EGR means exhaust gas or combustion gas recirculated from the exhaust port through the engine cylinder back to the intake port during a valve overlap period and thereafter drawn again in the cylinder. The amount of internal EGR (combustion gas recirculated from the exhaust port through the cylinder back to the intake port during a valve overlap period), mixed with fresh air, is controllable by increasing or decreasing the valve overlap. Generally, the greater the valve overlap period, the greater the amount of internal EGR.

Figure 3A:
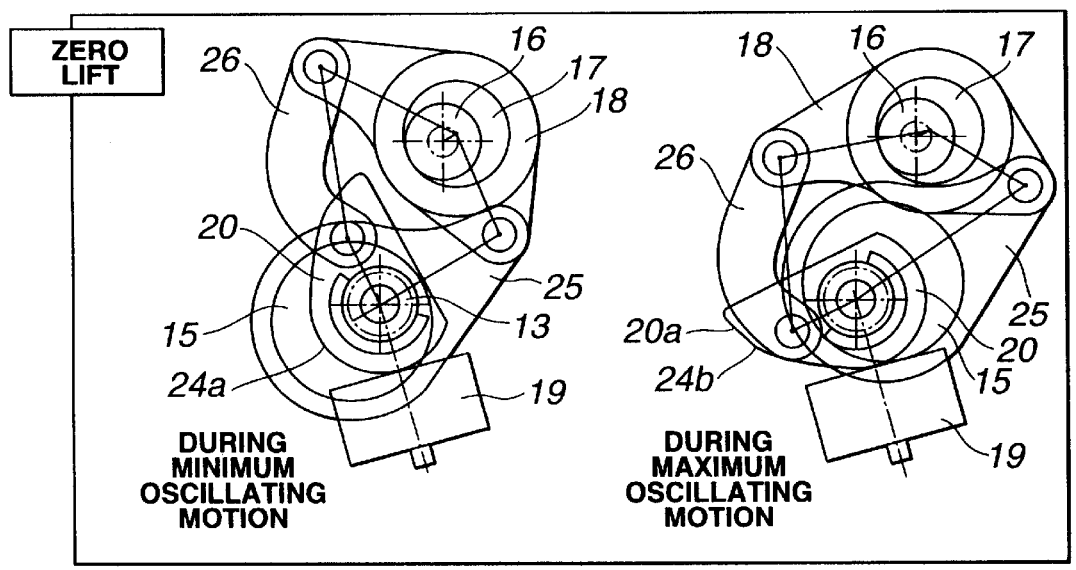
FIG. 3A is an explanatory view showing the essential linkage and valve operating mechanism layout of the embodiment under a zero-lift condition, as viewed from the axial direction of the crankshaft.
Figure 3B:
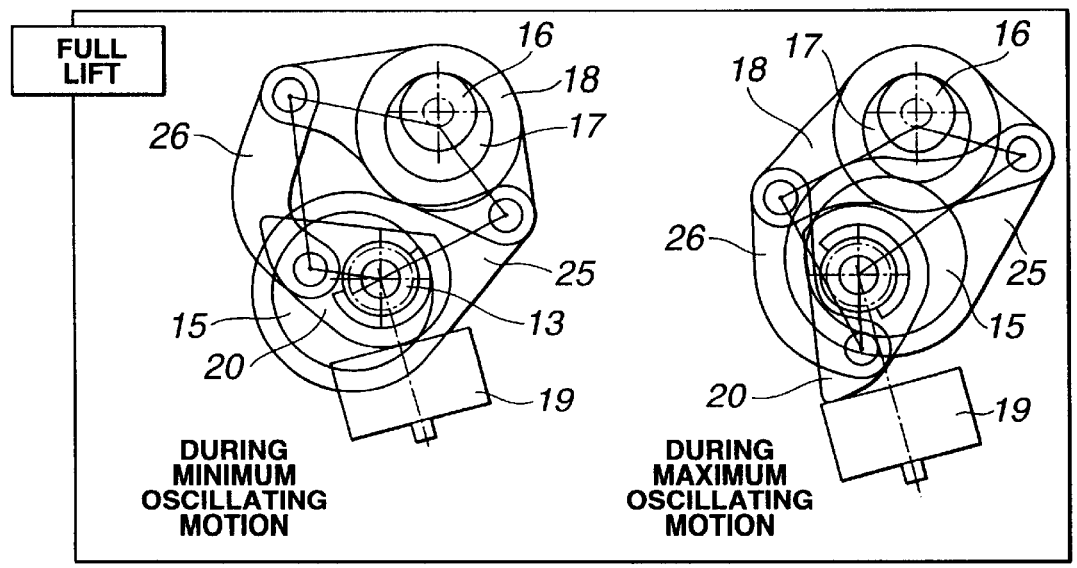
FIG. 3B is an explanatory view showing the essential linkage and valve operating mechanism layout of the embodiment under a full-lift condition, as viewed from the axial direction of the crankshaft.

The operation and fundamental structure of the essential part of variable lift and working angle control mechanism 1 are hereunder described briefly in reference to FIGS. 3A and 3B.

Variable lift and working angle control mechanism 1 is comprised of a cylindrical-hollow drive shaft 13 rotatably supported by a cam bracket (not numbered) located on the upper portion of a cylinder head (not numbered), a first eccentric cam 15 fixedly connected to drive shaft 13 by way of press-fitting, a control shaft 16 which is rotatably supported by the same cam bracket above the drive shaft and arranged parallel to the drive shaft and has a second eccentric cam 17, a rocker arm 18 oscillatingly or rockably supported on second eccentric cam 17, and a rockable cam 20 which is in abutted-engagement with a tappet or a valve lifter 19 of intake valve 12. First eccentric cam 15 and rocker arm 18 are mechanically linked to each other through a link arm 25 that rotates relative to first eccentric cam 15. On the other hand, rocker arm 18 and rockable cam 20 are linked to each other through a link member 26, so that the oscillating motion of rocker arm 18 is produced by link arm 25. As described later, drive shaft 13 is driven by an engine crankshaft via a timing chain or a timing belt. First eccentric cam 15 is cylindrical in shape. The central axis of the cylindrical outer peripheral surface of first eccentric cam 15 is eccentric to the axis of drive shaft 13 by a predetermined eccentricity. A substantially annular portion 25a of link arm 25 is rotatably fitted onto the cylindrical outer peripheral surface of first eccentric cam 15. Rocker arm 18 is oscillatingly supported at its substantially central portion by second eccentric cam 17 of control shaft 16. A protruded portion 25b of link arm 25 is linked to one end of rocker arm 18. The upper end of link member 26 is linked to the other end of rocker arm 18. The axis of second eccentric cam 17 is eccentric to the axis of control shaft 16, and thus the center of oscillating motion of rocker arm 18 can be varied by changing the angular position of control shaft 16. Rockable cam 20 is rotatably fitted onto the outer periphery of drive shaft 13. Radially-protruding end portion 20a of rockable cam 20 is linked to link member 26 by means of a pivot pin. Rockable cam 20 is formed on its lower surface with a base-circle surface portion 24a being concentric to drive shaft 13 and a moderately-curved cam surface portion 24b being continuous with base-circle surface portion 24a and extending toward radially-protruding end portion 20a of rockable cam 20. Base-circle surface portion 24a and cam surface portion 24b of rockable cam 20 are designed to be brought into abutted-contact (sliding-contact) with a designated point or a designated position of the upper surface of the associated intake-valve lifter 19, depending on an angular position of rockable cam 20 oscillating. That is, base-circle surface portion 24a functions as a base-circle section within which a valve lift is zero. A predetermined angular range of cam surface portion 24b being continuous with base-circle surface portion 24a functions as a ramp section. A predetermined angular range of a cam nose portion of cam surface portion 24b being continuous with the ramp section functions as a lift section. Returning again to FIG. 2, control shaft 16 of variable lift and working angle control mechanism 1 is driven within a predetermined angular range by means of a lift and working angle control hydraulic actuator 31. A controlled pressure applied to hydraulic actuator 31 is regulated or modulated by way of a first hydraulic control module (a lift and working angle control hydraulic modulator) 32 which is responsive to a control signal from an electronic engine control unit (ECU) 33. Hydraulic actuator 31 is designed so that the angular position of the output shaft of hydraulic actuator 31 is forced toward and held at an initial angular position by a return spring means with first hydraulic control module 32 de-energized. In a state that hydraulic actuator 31 is kept at the initial angular position, the intake valve is operated with the valve lift reduced and the working angle reduced. Variable lift and working angle control mechanism 1 operates as follows.

During rotation of drive shaft 13, link arm 25 moves up and down by virtue of cam action of first eccentric cam 15. The up-and-down motion of link arm 25 causes oscillating motion of rocker arm 18. The oscillating motion of rocker arm 18 is transmitted via link member 26 to rockable cam 20, and thus rockable cam 20 oscillates. By virtue of cam action of rockable cam 20 oscillating, intake-valve lifter 19 is pushed and therefore intake valve 12 lifts. If the angular position of control shaft 16 is varied by hydraulic actuator 31, an initial position of rocker arm 18 varies and as a result an initial position (or a starting point) of the oscillating motion of rockable cam 20 also varies. Assuming that the angular position of second eccentric cam 17 is shifted from a first angular position that the axis of second eccentric cam 17 is located just under the axis of control shaft 16 to a second angular position (see FIG. 3A) that the axis of second eccentric cam 17 is located just above the axis of control shaft 16, as a whole rocker arm 18 shifts upwards. As a result, radially-protruding end portion 20a of rockable cam 20 is relatively pulled upwards. That is, the initial position (the starting point) of rockable cam 20 is displaced or shifted so that the rockable cam itself is inclined in a direction that cam surface portion 24b of rockable cam 20 moves apart from intake-valve lifter 19. With rocker arm 18 shifted upwards, when rockable cam 20 oscillates during rotation of drive shaft 13, base-circle surface portion 24a is held in contact with intake-valve lifter 19 for a comparatively long time period. In other words, a time period within which cam surface portion 24b is held in contact with intake-valve lifter 19 becomes short. As a consequence, a valve lift becomes small. Additionally, a lifted period (i.e., a working angle EA) from intake-valve open timing IVO to intake-valve closure timing IVC becomes reduced.

Figure 4:
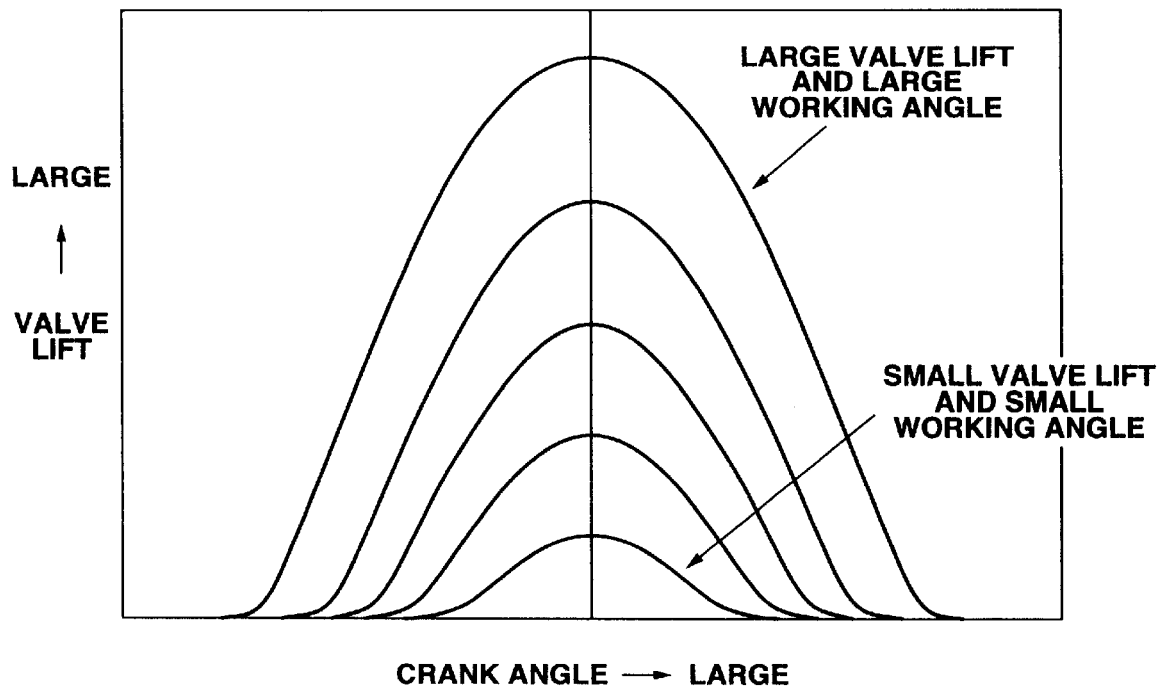
FIG. 4 shows lift and working angle characteristic curves given by the variable lift and working angle control mechanism of FIG. 2.

Conversely when the angular position of second eccentric cam 17 is shifted from the second angular position that the axis of second eccentric cam 17 is located just above the axis of control shaft 16 to the first angular position (see FIG. 3B) that the axis of second eccentric cam 17 is located just under the axis of control shaft 16, as a whole, rocker arm 18 shifts downwards. As a result, radially-protruding end portion 20a of rockable cam 20 is relatively pushed down. That is, the initial position (the starting point) of rockable cam 20 is displaced or shifted so that the rockable cam itself is inclined in a direction that cam surface portion 24b of rockable cam 20 moves towards intake-valve lifter 19. With rocker arm 18 shifted downwards, when rockable cam 20 oscillates during rotation of drive shaft 13, a portion that is brought into contact with intake-valve lifter 19 is somewhat shifted from base-circle surface portion 24a to cam surface portion 24b. As a consequence, a valve lift becomes large. Additionally, a lifted period (i.e., a working angle EA) from intake-valve open timing IVO to intake-valve closure timing IVC becomes extended. The angular position of second eccentric cam 17 can be continuously varied within limits by means of hydraulic actuator 31, and thus valve lift characteristics (valve lift and working angle) also vary continuously as shown in FIG. 4. As can be seen from the valve lift characteristics of FIG. 4, variable lift and working angle control mechanism 1 can scale up and down both the valve lift and the working angle continuously simultaneously. As clearly seen in FIG. 4, in the variable lift and working angle control mechanism 1 incorporated in the integrated engine control system of the embodiment, in accordance with a change in valve lift and a change in working angle EA, intake-valve open timing IVO and intake-valve closure timing IVC vary symmetrically with each other. Details of such a variable lift and working angle control mechanism being set forth, for example, in U.S. Pat. No. 5,988,125 (corresponding to Japanese Patent Provisional Publication No. 11-107725) issued Nov. 23, 1999 to Seinosuke HARA et al., the teachings of which are hereby incorporated by reference.

Figure 5:
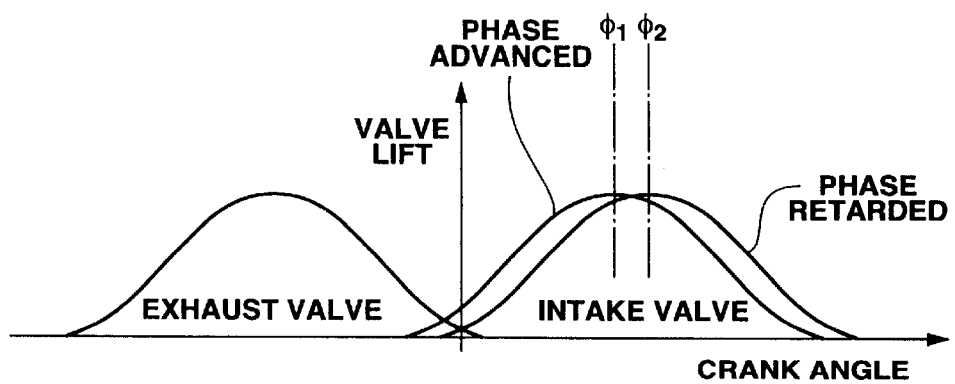
FIG. 5 shows phase-change characteristic curves for a phase of working angle that means an angular phase at the maximum valve lift point, often called "central angle φ", given by the variable phase control mechanism of FIG. 2.

Returning to FIG. 2, variable phase control mechanism 2 is comprised of a cam sprocket 35 and a phase control hydraulic actuator 36. Sprocket 35 is provided at the front end of drive shaft 13. Phase control hydraulic actuator 36 is provided to enable drive shaft 13 to rotate relative to sprocket 35 within a predetermined angular range. Sprocket 35 has a driven connection with the engine crankshaft through a timing chain (not shown) or a timing belt (not shown). A controlled pressure applied to hydraulic actuator 36 is regulated or modulated by way of a second hydraulic control module 37 (a phase control hydraulic modulator), which is responsive to a control signal from ECU 33. The relative rotation of drive shaft 13 to sprocket 35 in one rotational direction results in a phase advance at the maximum intake-valve lift point (at the central angle φ). The relative rotation of drive shaft 13 to sprocket 35 in the opposite rotational direction results in a phase retard at the maximum intake-valve lift point. As appreciated from the phase-change characteristic curves shown in FIG. 5, only the phase of working angle (i.e., the angular phase at central angle φ) is advanced (see the characteristic curve of a central angle $\phi_1$ of FIG. 5) or retarded (see the characteristic curve of a central angle $\phi_2$ of FIG. 5), with no valve-lift change and no working-angle change. The relative angular position of drive shaft 13 to sprocket 35 can be continuously varied within limits by means of hydraulic actuator 36, and thus the angular phase at central angle φ also varies continuously. In the shown embodiment, each of actuators 31 and 36 are hydraulically controlled. Alternatively, each of a lift and working angle control actuator and a phase control actuator may be constructed by means of an electromagnetically controlled actuator. In lieu thereof, for variable lift and working angle control and variable phase control, a first sensor that detects a valve lift and working angle EA and a second sensor that detects an angular phase at central angle φ are added and variable lift and working angle control mechanism 1 and variable phase control mechanism 2 may be feedback-controlled respectively based on signals from the first and second sensors at a "closed-loop" mode. Alternatively, variable lift and working angle control mechanism 1 and variable phase control mechanism 2 may be merely feedforward-controlled depending on engine/vehicle operating conditions at an "open-loop" mode.

Figure 6:
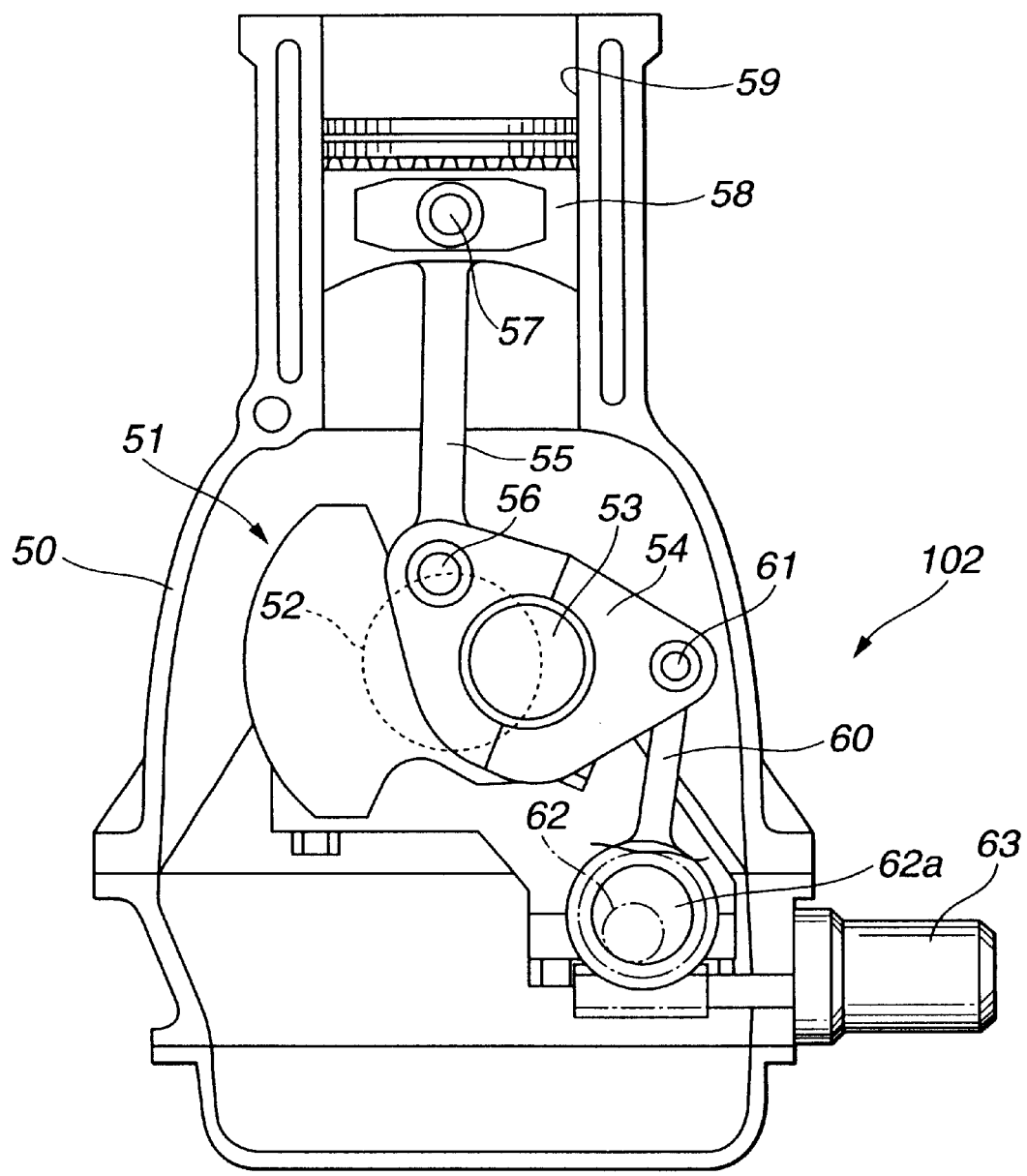
FIG. 6 is a front elevation view illustrating the essential linkage layout of the multi-link type reciprocating engine of the embodiment, as viewed from the axial direction of the crankshaft.

Referring now to FIG. 6, there is shown the linkage layout of variable compression ratio mechanism (variable piston stroke characteristic mechanism) 102 incorporated in the integrated engine control system of the embodiment. The variable compression ratio mechanism is comprised of a multi-link type piston-crank mechanism. A linkage of variable compression ratio mechanism 102 (multi-link type piston-crank mechanism) is composed of three links, namely an upper link 55, a lower link 54 and a control link 60. Engine crankshaft 51 is formed with a plurality of crank journals 52 and crankpins 53. Crank journals 52 are rotatably supported by respective main bearings of a cylinder block 50. The axis of crankpin 53 is eccentric to the axis of crank journal 52 by a predetermined eccentricity. Lower link 54 (the second link) is rotatably fitted onto crankpin 53. As can be seen in FIG. 6, lower link 54 is split into a plurality of component parts, namely a right-hand half round portion with a semi-cylindrical bore and a left-hand half round portion with a semi-cylindrical bore. By way of the half round portions of lower link 54 assembled to each other, lower link 54 is supported on the associated crankpin so as to permit relative rotation of the lower link about the axis of the crankpin. Concretely, the two half round portions are attached to the crankpin by fastening one of the half round portions to the other with fastening means such as mounting bolts. The lower end of upper link 55 (the first link) is rotatably connected or linked to one end of lower link 54 via a connecting pin 56. The upper end of upper link 55 is rotatably connected via a piston pin 57 to a reciprocating piston 58. The piston crown of piston 58 receives combustion pressure Pi that causes reciprocating motion of piston 58 within a cylinder 59 of cylinder block 50. Intake valves 12 and exhaust valves are located above each cylinder 59.

Figure 8A:
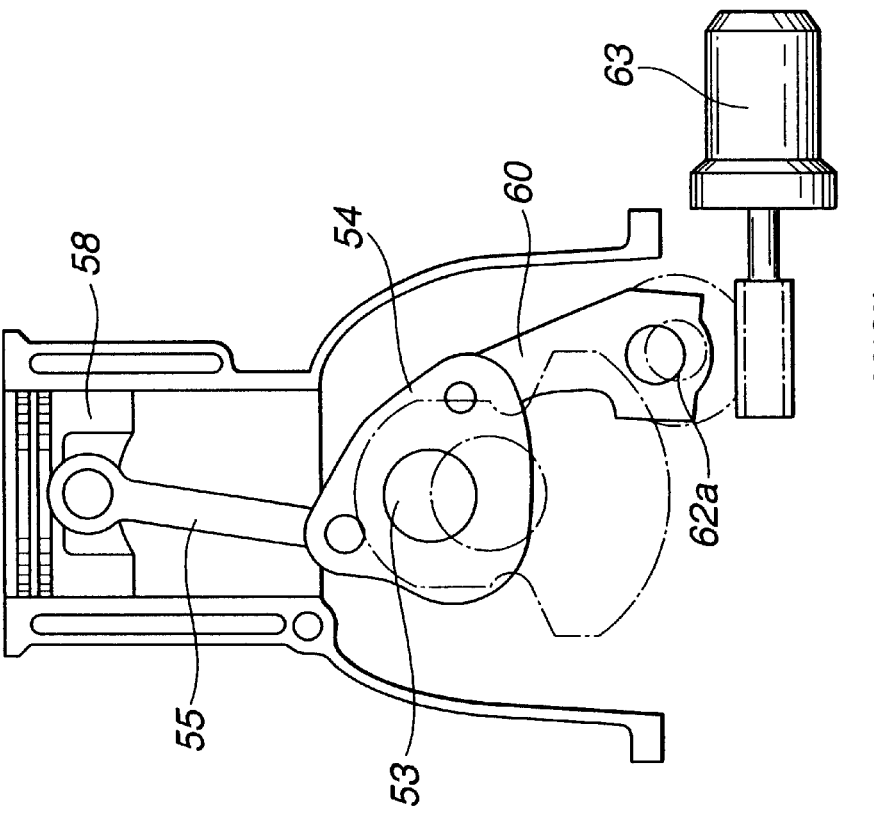
FIG. 8A is an explanatory view illustrating the linkage layout of the variable compression ratio mechanism (the multi-link type piston-crank mechanism) in a high compression ratio operating mode, as viewed from the axial direction of the crankshaft.
Figure 8B:
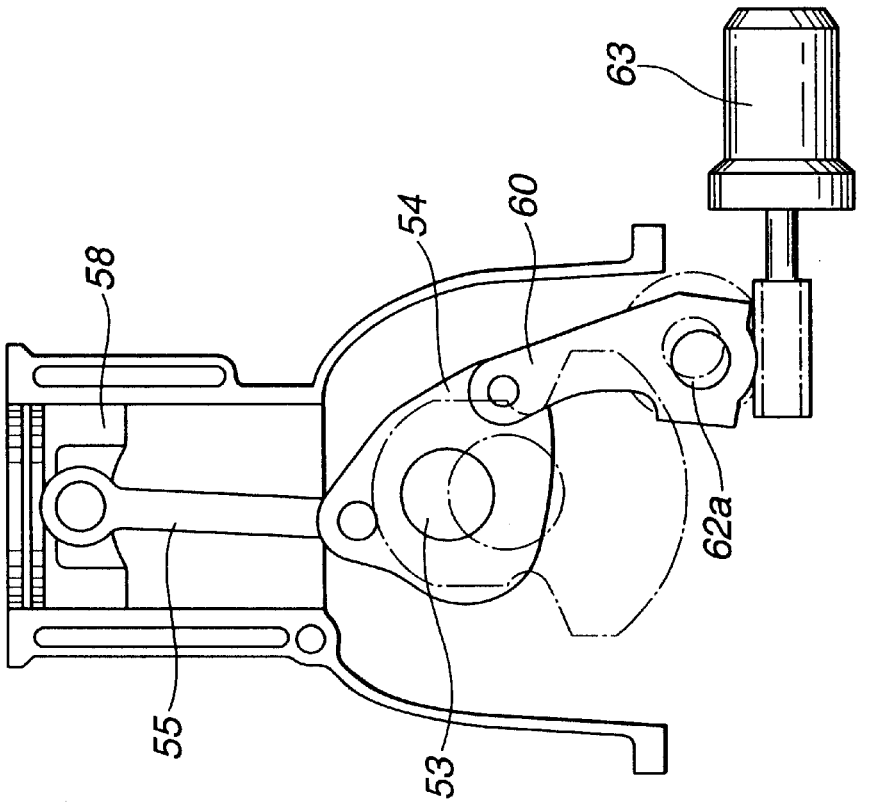
FIG. 8B is an explanatory view illustrating the linkage layout of the variable compression ratio mechanism (the multi-link type piston-crank mechanism) in a low compression ratio operating mode, as viewed from the axial direction of the crankshaft.

The upper end of control link 60 (the third link) is rotatably linked to the other end of lower link 54 via a connecting pin 61. The lower end of control link 60 is rotatably linked to the lower portion of cylinder block 50 (a part of the engine body) via a control shaft 62. In more detail, control shaft 62 is rotatably supported on the engine body and extends parallel to crankshaft 51. Control shaft 62 has an eccentric cam portion 62a whose rotation center is eccentric to the rotation center of control shaft 62 by a predetermined eccentricity. The lower end of control link 60 is oscillatingly fitted to eccentric cam portion 62a, so as to restrict the degree of freedom of the lower link. The previously-noted control shaft 62 is driven by means of an electronically controlled piston-stroke characteristic control actuator (or an electronically controlled compression ratio control actuator) 63. Actuator 63 is controlled in response to a control signal from ECU 33. For instance, actuator 63 may be comprised of a worm gear attached to the output shaft of actuator 63 and a worm wheel fixedly connected to control shaft 62 so that the worm wheel is coaxially arranged with respect to the axis of control shaft 62, and an electric motor driving the actuator output shaft. For variable piston stroke characteristic control (variable compression ratio control), a piston-stroke sensor that detects a piston stroke of reciprocating piston 58 may be added and variable compression ratio mechanism 102 may be feedback-controlled based on a signal from the piston-stroke sensor at a "closed-loop" mode. In lieu thereof, variable compression ratio mechanism 102 may be merely feedforward-controlled depending on engine/vehicle operating conditions at an "open-loop" mode. As can be appreciated from the front elevation view of FIG. 6, when control shaft 62 is driven by actuator 63, the rotation center of eccentric cam portion 62a moves relative to the rotation center of control shaft 62. That is, the relative position of eccentric cam portion 62a to the engine body varies. In other words, the center of oscillating motion of control link 60 varies due to rotary motion of control shaft 62. As a result, at least one of the TDC position and the BDC position can be varied and thus the piston stroke characteristic (the length of piston stroke) can be varied. That is, it is possible to increase or decrease the compression ratio, defined as a ratio $(V_1+V_2)/V_1$ of the full volume $(V_1+V_2)$ existing within the engine cylinder and combustion chamber with the piston at BDC to the clearance-space volume $(V_1)$ with the piston at TDC, by varying the center of oscillating motion of control link 60. In other words, by changing or shifting the center of oscillating motion of control link 60, the attitude of lower link 54 changes, thus varying at least one of the TDC position and BDC position of reciprocating piston 58 and consequently varying the compression ratio of the engine. FIG. 8A shows the relative position of eccentric cam portion 62a relative to the engine body and the linkage layout of three major link components 55, 54, and 60 in a high compression ratio operating mode, whereas FIG. 8B shows the relative position of eccentric cam portion 62a relative to the engine body and the linkage layout of three major link components in a low compression ratio operating mode. The compression ratio can be varied continuously between the high compression ratio operating mode (see FIG. 8A) and the low compression ratio operating mode (see FIG. 8B).

Figure 7A:
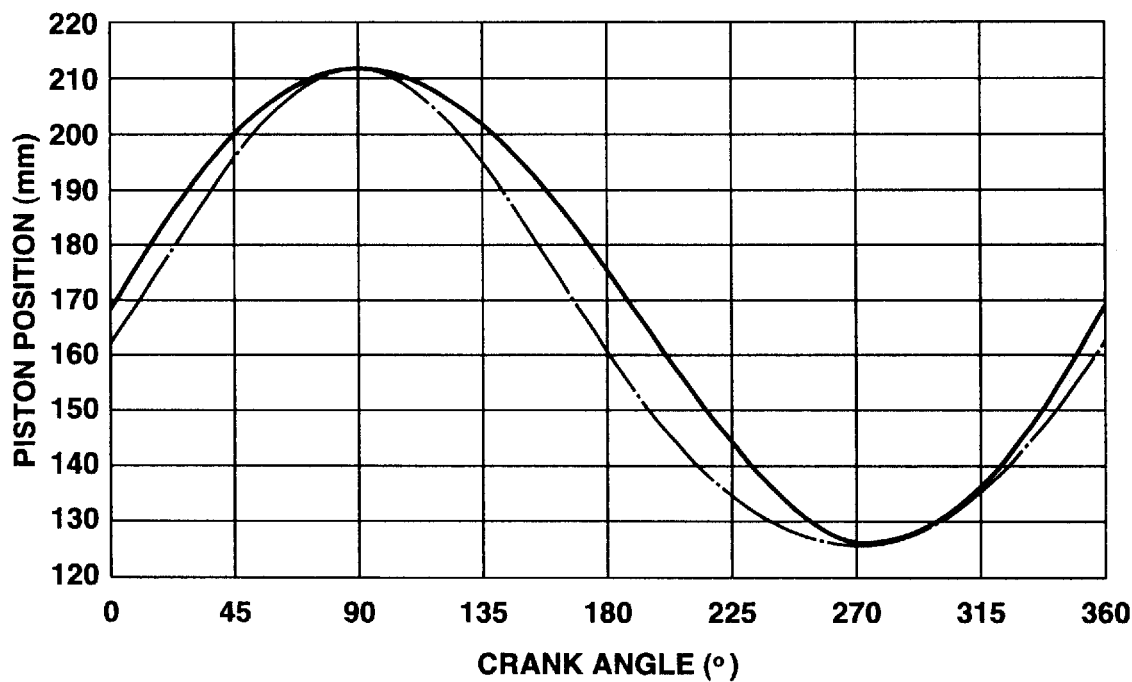
FIG. 7A is a characteristic curve showing a piston stroke characteristic obtained by the multi-link type piston-crank mechanism incorporated in the reciprocating engine of the embodiment and serving as the variable compression ratio mechanism.
Figure 7B:
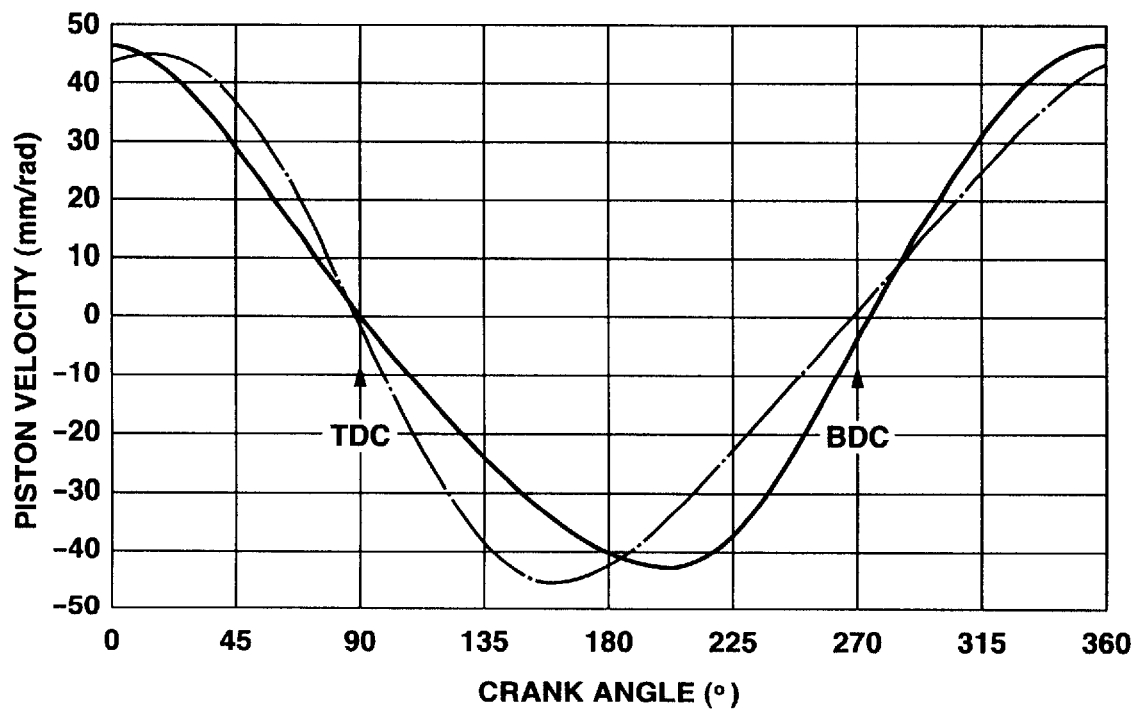
FIG. 7B is a characteristic curve showing a piston velocity characteristic obtained by the multi-link type piston-crank mechanism incorporated in the reciprocating engine of the embodiment and serving as the variable compression ratio mechanism.

In the previously-discussed multi-link type piston-crank mechanism serving as variable compression ratio mechanism 102, contriving or properly selecting the length of each of links and the position of a fulcrum point of each link enables the vibrating system of reciprocating motion of piston 58 to approach to a simple harmonic vibration (that is, a periodic motion that the displacement with respect to time is described by a simple sine function). In FIG. 7A, the heavy solid line indicates the piston stroke characteristic (variations in the position of reciprocating piston 58), obtained by the multi-link type piston-crank mechanism incorporated in the reciprocating engine of the embodiment, whereas the one-dotted line indicates the piston stroke characteristic, obtained by a conventional single-link type piston-crank mechanism that each reciprocating piston is connected to a crankshaft via a single link (a connecting rod). As can be appreciated from the piston stroke characteristic indicated by the heavy solid line in FIG. 7A, in case of the multi-link type piston-crank mechanism incorporated in the reciprocating engine of the embodiment, the reciprocating motion of piston 58 is approximate to a simple harmonic motion by contriving or properly selecting the length of each of links and the position of the fulcrum point of each link. On the other hand, the characteristic curve indicated by the heavy solid line in FIG. 7B shows the piston velocity characteristic (a rate of change in the piston position with respect to unit crankangle), obtained by the multi-link type piston-crank mechanism incorporated in the reciprocating engine of the embodiment, whereas the characteristic curve indicated by the one-dotted line in FIG. 7B shows the piston velocity characteristic, obtained by the conventional single-link type piston-crank mechanism. Generally, in the single-link type piston-crank mechanism, the piston velocity near the TDC position of the piston tends to be higher than the piston velocity near the BDC position. The multi-link type piston-crank mechanism incorporated in the reciprocating engine of the embodiment, which the reciprocating motion of piston 58 is approximate to a simple harmonic motion, is advantageous with respect to reduction in noise and vibration. In comparison with the piston velocity near the TDC position, produced by the single-link type piston-crank mechanism, the piston velocity near the TDC position (near 90° crankangle in FIGS. 7A and 7B), produced by the multi-link type piston-crank mechanism incorporated in the reciprocating engine of the embodiment, tends to be slower. The relatively slower piston velocity means that piston 58 is staying near the TDC position for a longer time period, as compared to the single-link type piston-crank mechanism. That is, the major part of combustion can be achieved near the TDC position. The slower piston velocity near the TDC position contributes to a reduction in time loss under a specific condition that the combustion velocity is slow, such as under a part load condition. As can be appreciated from the characteristic curve indicated by the solid line in FIG. 7B, in order for the major part of combustion to become achieved near the TDC position, the linkage layout of the multi-link type piston-crank mechanism of the embodiment is set or designed so that the rate of change in piston velocity at TDC (or near TDC) with respect to crankangle, that is, the maximum piston acceleration at TDC (or near TDC), is less than the rate of change in piston velocity at BDC (or near BDC) with respect to crankangle, that is, the maximum piston acceleration at BDC (or near BDC).

In order for the reciprocating motion of piston 58 to become approximate to a simple harmonic motion, more concretely, the multi-link type piston-crank mechanism incorporated in the reciprocating engine of the embodiment has the following multi-link construction, that is, the following link dimensions, coordinates of the axis of the control shaft, and an x-coordinate of the trace line 1 of reciprocating motion of the axis of piston pin 57.

Figure 13A:
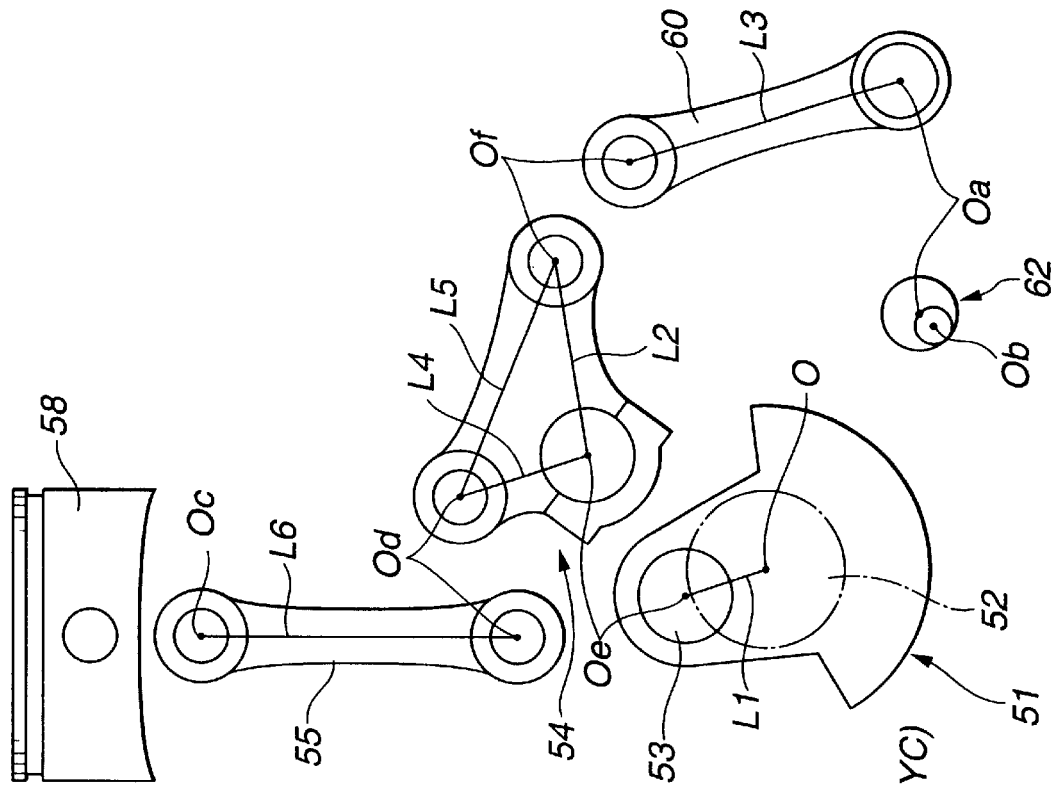
FIG. 13A shows an example of the linkage layout of the multi-link type reciprocating engine that the reciprocating motion of the piston is approximate to a simple harmonic motion.
Figure 13B:
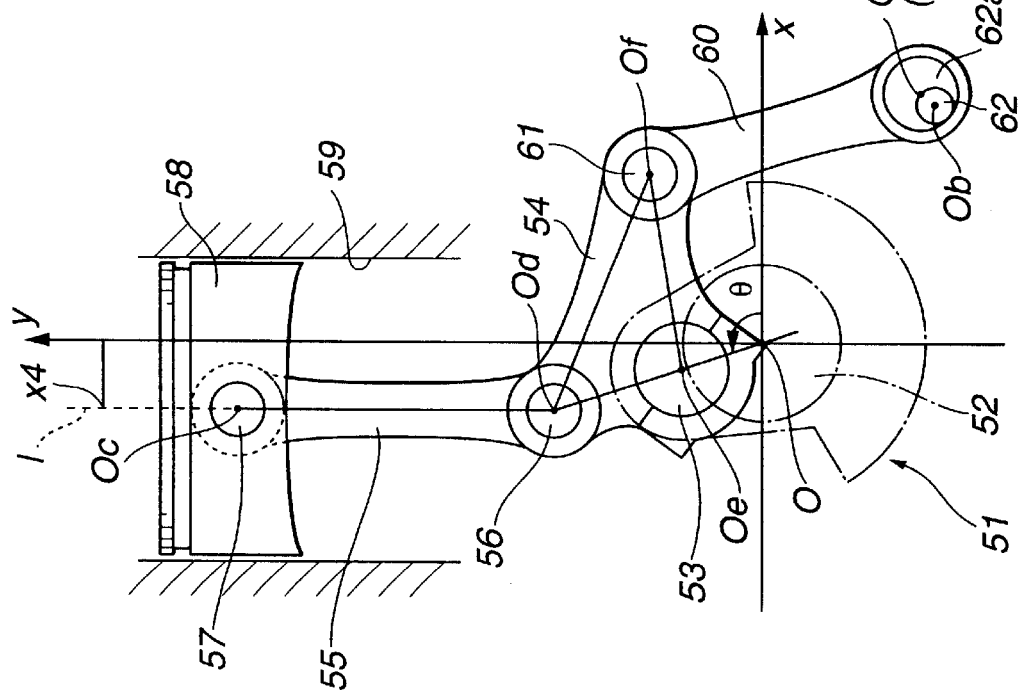
FIG. 13B is a disassembled view of the linkage of the multi-link type reciprocating engine shown in FIG. 13A.

As shown in FIG. 13A, on the assumption that the rotation center of crankshaft 51, that is, the axis of crank journal 52 is defined as the origin O, a directed line Ox parallel to a direction (major and minor side thrust directions) perpendicular to piston pin 57 and a trace line 1 of reciprocating motion of the axis $O_c$ of piston pin 57 as viewed from the direction of the axis $O_c$ of piston pin 57 is taken as an x-axis, whereas a directed line Oy parallel to the previously-noted trace line 1 of reciprocating motion of the axis $O_c$ of piston pin 57 is taken as a y-axis. The directed lines Ox and Oy intersect at a right angle at the origin O. The trace line 1 of reciprocating motion of the axis $O_c$ of piston pin 57 generally corresponds to the cylinder centerline of cylinder 59. In addition to the above, assuming that the direction of rotation of crankshaft 51 is defined as a counterclockwise direction as viewed from the front end of the engine, in the multi-link type reciprocating internal combustion engine of the embodiment, note that an x-coordinate of the previously-noted trace line 1 passing through the axis $O_c$ of piston pin 57 is set to a negative value, whereas an x-coordinate of the axis $O_a$ of control-shaft eccentric cam portion 62a, whose axis ($O_a$) serves as a pivot of oscillating motion of control link 60, is set to a positive value. In more detail, as shown in FIG. 13B, assuming that the distance $|OO_e|$ between the rotation center O of crankshaft 51 (exactly, the axis O of crank journal 52) and the axis $O_e$ of crank pin 53 is defined as L1, the distance $|O_eO_f|$ between the axis $O_e$ of crank pin 53 and the axis (which will be hereinafter referred to as a "first axis") $O_f$ of connecting pin 61 is defined as L2, the length of control link 60 is defined as L3, the distance $|O_eO_d|$ between the axis $O_e$ of crank pin 53 and the axis (which will be hereinafter referred to as a "second axis") $O_d$ of connecting pin 56 is defined as L4, the distance $|O_fO_d|$ between the first axis $O_f$ and the second axis $O_d$ is defined as L5, the length of upper link 55 is defined as L6, the coordinates of the axis $O_a$ of control-shaft eccentric cam portion 62a (i.e., the pivot $O_a$ of oscillating motion of control link 60) are defined as (XC, YC), and the x-coordinate of the trace line 1 of reciprocating motion of the axis $O_c$ of piston pin 57 is defined as x4, these dimensions (L1, L2, L3, L4, L5, L6), the coordinates (XC, YC) of the pivot $O_a$ of oscillating motion of control link 60, and the x-coordinate x4 of the trace line 1 of reciprocating motion of the axis $O_c$ of piston pin 57 are set to satisfy the following predetermined ratio.

L1: L2: L3: L4: L5: L6: XC:YC:x4= ≈1:2.4:2.65~3.5:0.69:3.0~3.4:3.3~3.55:3.2~3.55: −2~−1.35: −1~−0.6

As can be appreciated, the coordinates (XC, YC) of the axis (or the pivot) $O_a$ vary depending on the angular position of control shaft 62, however, in the multi-link type reciprocating engine of the embodiment, the dimensions (L1, L2, L3, L4, L5, L6), the coordinates (XC, YC) of the axis $O_a$, and the x-coordinate x4 of the trace line 1 of reciprocating motion of piston-pin axis $O_c$ are set to satisfy the above predetermined ratio, when the angular position of control shaft 62 is within a controlled range. With the previously-discussed multi-link construction, the reciprocating motion of the piston is approximate to a simple harmonic motion, thus ensuring a 20% slower reciprocating motion near the TDC position of piston 58, as compared to the conventional single-link type piston-crank mechanism.

Figure 9:
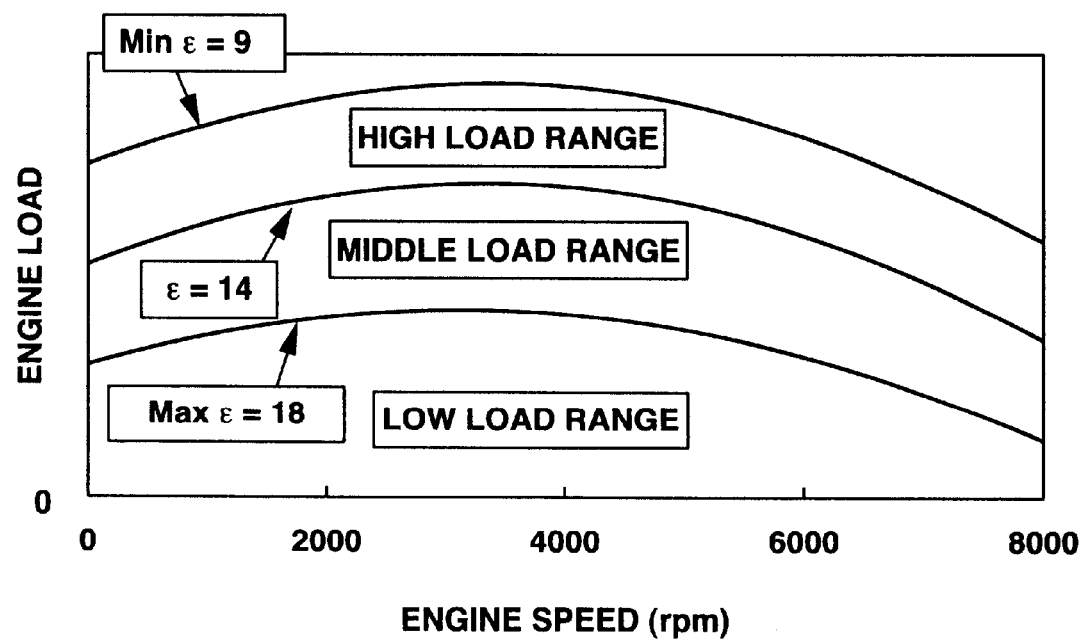
FIG. 9 shows a general control characteristic for mechanical compression ratio $\epsilon$ depending on engine operating conditions.

Referring now to FIG. 9, there is shown the first control characteristic for mechanical compression ratio ε variably controlled by variable compression ratio mechanism 102. As can be seen from the general mechanical-compression-ratio ε control characteristic of FIG. 9, basically, mechanical compression ratio ε is controlled to a relatively low value such as "9" under a high load condition, and controlled to a relatively high value such as "18" under a part load condition. Mechanical compression ratio $\epsilon$ is a geometrical compression ratio whose control characteristic can be determined by only a change in the full volume $(V_1+V_2)$ existing within the engine cylinder and combustion chamber with the piston at BDC, whose volume change occurs due to a change in piston stroke characteristic controlled or determined by variable compression ratio mechanism 102. In case of the multi-link type reciprocating engine of the embodiment that variable compression ratio mechanism 102 is combined to variable valve operating mechanism 101, the actual compression ratio is determined depending on the change in valve lift characteristic (valve lift and working angle) of intake valve 12 as well as the change in piston stroke characteristic. To distinguish mechanical compression ratio $\epsilon$ from the actual compression ratio, the actual compression ratio will be hereinafter is referred to as an "effective compression ratio $\epsilon'$".

Figure 10:
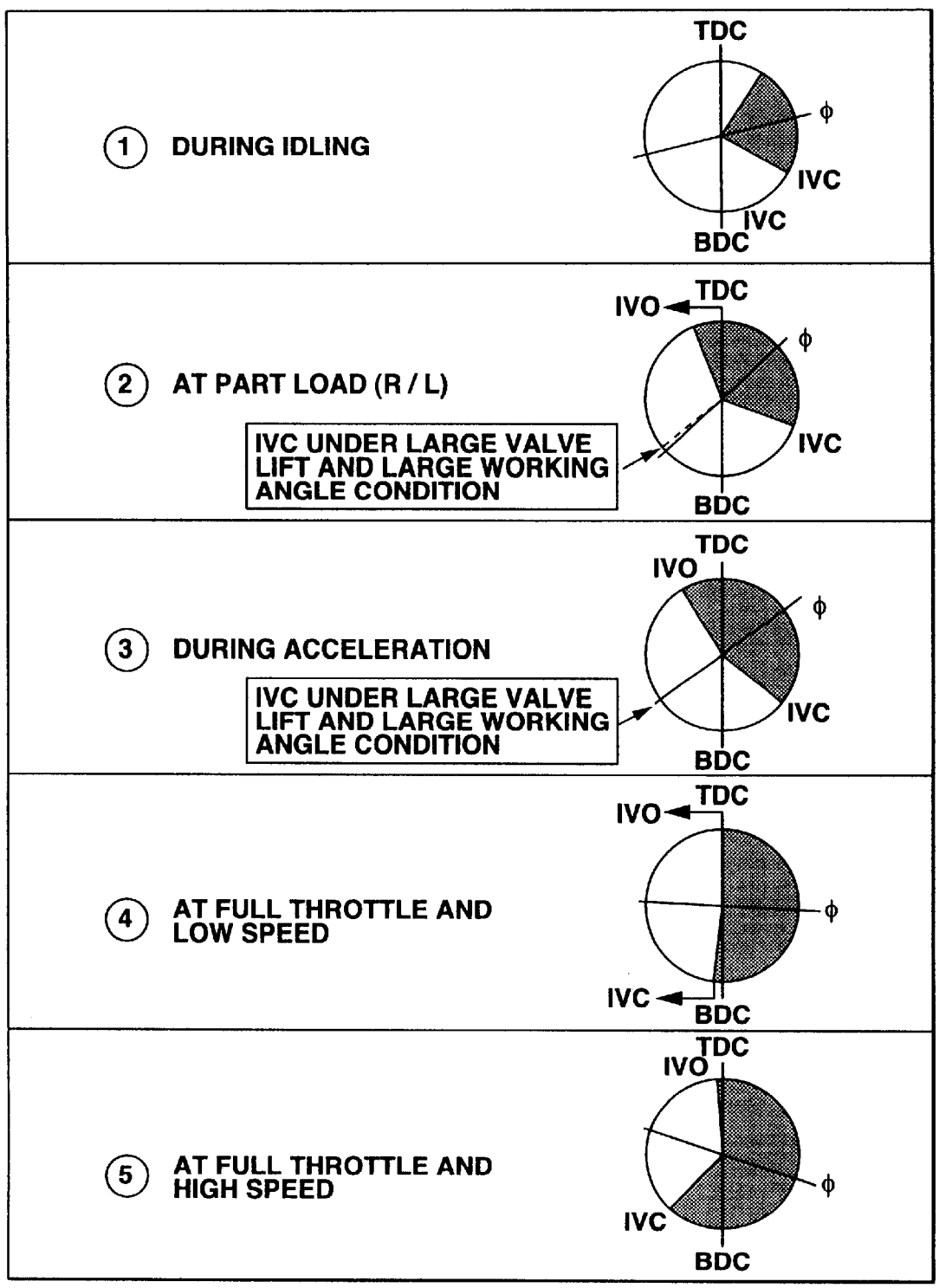
FIG. 10 is an explanatory view showing a valve lift characteristic (intake valve open timing IVO, intake valve closure timing IVC, working angle EA, central angle φ) of the intake valve, performed by the variable valve operating mechanism incorporated in the multi-link type reciprocating engine of the embodiment, under various engine/vehicle operating conditions, that is, during idling, at part load, during acceleration, at full throttle and low speed, and at full throttle and high speed.

Referring now to FIG. 10, there is shown the intake valve lift characteristic performed by variable valve operating mechanism 101 incorporated in the multi-link type reciprocating engine of the embodiment. As seen from FIG. 10, the intake valve open timing IVO, intake valve closure timing IVC, lifted period (i.e., working angle EA) from intake-valve open timing IVO to intake-valve closure timing IVC, and a phase of working angle that means an angular phase at the maximum valve lift point, often called "central angle $\phi$", given by the variable phase control mechanism vary depending on various engine/vehicle operating conditions, that is, during idling, at part load whose condition is often abbreviated to "R/L (Road/load)" substantially corresponding to a ¼ throttle opening, during acceleration, at full throttle and low speed, and at full throttle and high speed. As shown in FIG. 10, at an idling condition ① and at a part load condition ②, each of the valve lift and working angle EA of the intake valve is controlled to a comparatively small value. On the other hand, intake valve closure timing IVC is phase-advanced to a considerably earlier point before bottom dead center (BBDC) on intake stroke. Due to the IVC considerably advanced, it is possible to greatly reduce the pumping loss. At this time, assuming that nominal compression ratio $\epsilon$ is fixed to a usual level, the actual compression ratio (effective compression ratio $\epsilon'$) tends to reduce owing to the phase-advanced IVC. The reduced effective compression ratio, on the one hand, deteriorates the quality of combustion of the air-fuel mixture in the engine cylinder, and on the other hand, causes a reduced tendency of knocking and thus enables the ratio of internal EGR to external EGR to be increased. In such a low engine-load range (in a small engine torque range) such as under the idling condition ① and under the part load condition ②, as can be appreciated from the engine operating conditions (engine speed and load) versus compression ratio characteristic curves of FIG. 9, mechanical compression ratio $\epsilon$ is set or adjusted to a higher compression ratio so as to avoid combustion from deteriorating. In addition to the above, in order to increase the amount of internal EGR without depending on external EGR under the part load condition ②, the engine control system of the embodiment operates to properly advance intake valve open timing IVO to a timing BTDC and consequently to increase the valve overlap period.

Under an acceleration condition ③, there is a need to enhance the charging efficiency of intake air. Thus, variable valve operating mechanism 101 is controlled such that intake valve closure timing IVC approaches to BDC. In this case, to avoid undesired combustion knock, mechanical compression ratio $\epsilon$ is gradually reduced. In the system of the embodiment, to improve fuel economy in such a moderately accelerating region, the valve overlap period is also increasingly compensated for, thus realizing adequate internal EGR.

Under a full throttle and low speed condition ④ or under a full throttle and high speed condition ⑤, in order to produce the maximum intake-air quantity, working angle EA is adequately increased so that intake valve open timing IVO is controlled to a timing near TDC and that intake valve closure timing IVC is controlled to a timing BDC. As a result, effective compression ratio $\epsilon'$ tends to be adjusted to a higher effective compression ratio than the three engine operating conditions ①, ② and ③. For this reason, under the full throttle condition, mechanical compression ratio $\epsilon$ controlled by variable compression ratio mechanism 102 is set to a low compression ratio substantially identical to that of a conventional fixed compression-ratio internal combustion engine. In particular, under the full throttle and low speed condition ④ that there is an increased tendency for combustion knock to occur, mechanical compression ratio $\epsilon$ is controlled to a lower compression ratio. In contrast to the above, under the full throttle and high speed condition ⑤, working angle EA is further increased and additionally the phase of intake-valve central angle $\phi$ is retarded such that intake valve closure timing IVC is adjusted to a timing ABDC (after bottom dead center). This enhances the charging efficiency of intake air. Under the full throttle and high speed condition ⑤, combustion tends to be completed before a chemical reaction for peroxide (one of factors affecting combustion knock) develops, and thus mechanical compression ratio $\epsilon$ is set to a higher compression ratio than that under the full throttle low speed condition.

As set forth above, according to the system of the embodiment, under the part load condition, basically, mechanical compression ratio $\epsilon$ is controlled to high, intake valve closure timing IVC is controlled to a timing BBDC on intake stroke, and additionally adequate EGR is achieved by way of internal EGR. Actually, such internal EGR is realized by increasing the valve overlap period by means of variable valve operating mechanism 101. In lieu of the use of internal EGR, external EGR may be used. Such external EGR (described later in reference to the system block diagram shown in FIG. 14) is realized by way of an external EGR control system 104 employing an EGR passage 74 and an EGR control valve 75. As is generally known, the EGR amount (or EGR rate) can be adjusted by controlling the opening Ae of EGR control valve 75 depending on the engine/vehicle operating conditions. In case of the use of external EGR, there is no need to greatly increase the valve overlap period, and, therefore, intake valve open timing IVO must be compensated for in the timing-retardation direction as compared to the valve lift characteristics shown in FIG. 10 corresponding to the part load condition ② and acceleration condition ③.

The following TABLE 1 shows how various losses, namely cooling loss, pumping loss, and time loss, and a thermal efficiency are affected by four factors, that is, (1) adjustment of mechanical compression ratio $\epsilon$ to high, (2) early intake-valve closing, (3) adequate EGR, and (4) reduced piston velocity near TDC.

TABLE 1

|  | (1) HIGH COMPRESSION RATIO | (2) EARLY INTAKE-VALVE CLOSING | (3) ADEQUATE EGR | (4) REDUCED PISTON VELOCITY NEAR TDC |
|---|---|---|---|---|
| COOLING LOSS | INCREASE | DECREASE | DECREASE | INCREASE |
| PUMPING LOSS | — | DECREASE | DECREASE | — |
| TIME LOSS | — | INCREASE | INCREASE | DECREASE |
| THERMAL EFFICIENCY | BETTER | BETTER | BETTER | BETTER |

Figure 11:
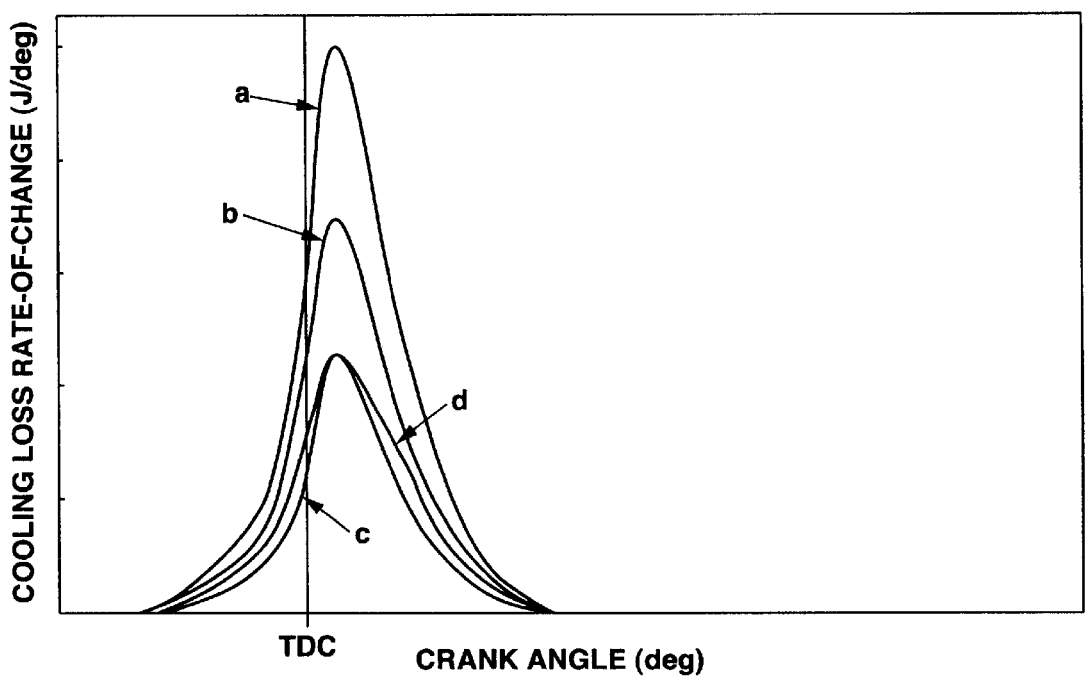
FIG. 11 shows four crankangle versus cooling-loss rate-of-change characteristic curves a, b, c and d under a proper combination of (1) adjustment of mechanical compression ratio $\epsilon$ to high, (2) early intake-valve closing, (3) adequate EGR, and (4) reduced piston velocity near TDC.
Figure 12:
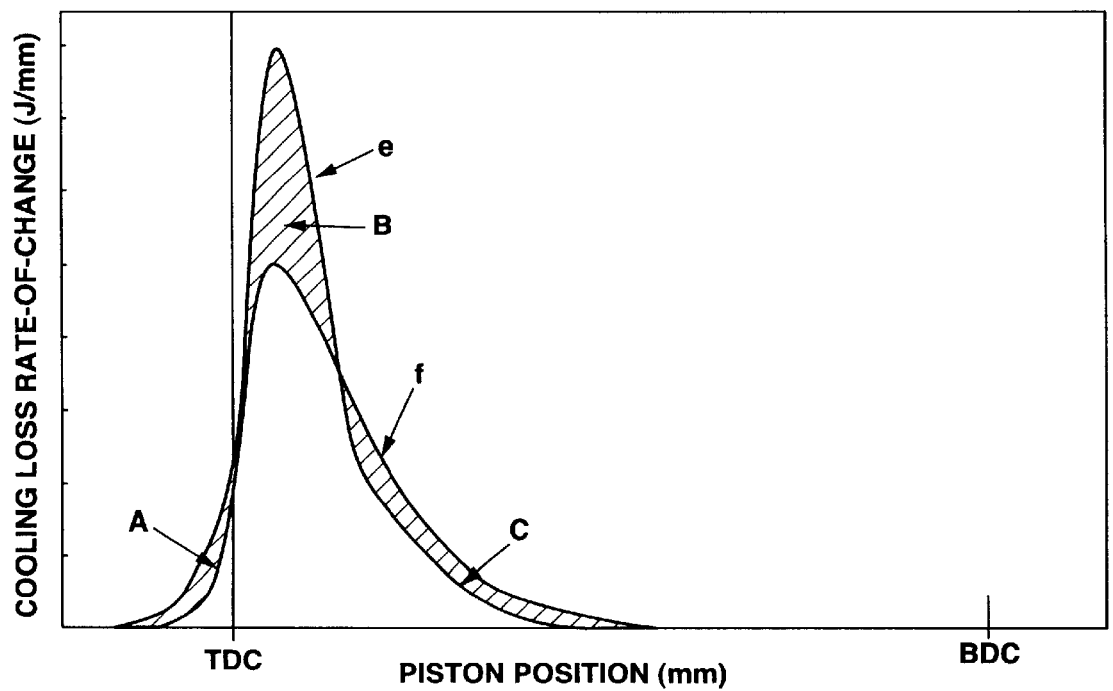
FIG. 12 shows piston position versus cooling-loss rate-of-change characteristic curves e and f, respectively obtained by the multi-link type reciprocating engine of the embodiment and a single-link type reciprocating engine.

As can be seen from the crankangle versus cooling-loss rate-of-change characteristic curves a, b, c and d shown in FIG. 11, the cooling-loss reduction effect varies depending on a proper combination of four factors (1), (2), (3), and (4). The first characteristic curve a shows a crankangle versus cooling-loss rate-of-change characteristic given due to only the factor (1), that is, adjustment of mechanical compression ratio $\epsilon$ to high. The second characteristic curve b shows a crankangle versus cooling-loss rate-of-change characteristic given due to a combination of the two factors (1) and (2), that is, a combination of adjustment of mechanical compression ratio $\epsilon$ to high and early intake-valve closing. The third characteristic curve c shows a crankangle versus cooling-loss rate-of-change characteristic given due to a combination of the three factors (1), (2), and (3), that is, a combination of adjustment of mechanical compression ratio $\epsilon$ to high, early intake-valve closing, and adequate EGR. The fourth characteristic curve d shows a crankangle versus cooling-loss rate-of-change characteristic given due to a combination of the four factors (1), (2), (3) and (4), that is, a combination of adjustment of mechanical compression ratio $\epsilon$ to high, early intake-valve closing, adequate EGR, and reduced piston velocity near TDC. As a test condition for each of the first, second, and third characteristic curves a, b, and c, the piston velocity near TDC is adjusted to be equivalent to a piston velocity near TDC, produced by a conventional single-link type piston-crank mechanism. As can be appreciated from TABLE 1 and the characteristic curves of FIG. 11, on the one hand, the cooling loss tends to increase due to (1) adjustment of mechanical compression ratio $\epsilon$ to high, and on the other hand, the cooling loss tends to decrease due to (2) early intake-valve closing and (3) adequate EGR. Owing to the factor (4), that is, reduced piston velocity near TDC, the cooling loss time tends to increase. However, combustion temperature tends to fall due to the increased EGR, and thus the cooling loss per unit time tends to reduce. As a whole, an increase in total cooling loss is very little. As can be seen from the piston stroke position versus cooling-loss rate-of-change characteristic curves e and f shown in FIG. 12, the time-loss reduction effect varies depending on the presence or absence of the fourth factor (4), that is, reduced piston velocity near TDC. The characteristic curve e shows a piston position versus cooling-loss rate-of-change characteristic obtained by the multi-link type piston-crank mechanism of the embodiment that the piston velocity can be reduced near TDC. On the other hand, the characteristic curve f shows a piston position versus cooling-loss rate-of-change characteristic obtained by the conventional single-link type piston-crank mechanism. In other words, the value of the integral of the characteristic curve showing the rate of change in cooling loss with respect to the piston stroke position can be correlated to the progress of combustion. As appreciated from the characteristic curve e obtained by the multi-link type piston-crank mechanism of the embodiment, the major part of combustion can be achieved near the TDC position. Therefore, according to the multi-link type reciprocating engine of the embodiment, the time loss tends to reduce within two areas A and C. On the other hand, as a whole the cooling loss tends to slightly increase such that, on the one hand, the cooling loss decreases within the two areas A and C in FIG. 12, and, on the other hand, that the cooling loss increases within an area B in FIG. 12. As discussed above, such a slight increase in cooling loss can be effectively suppressed by way of proper EGR.

Figure 14:
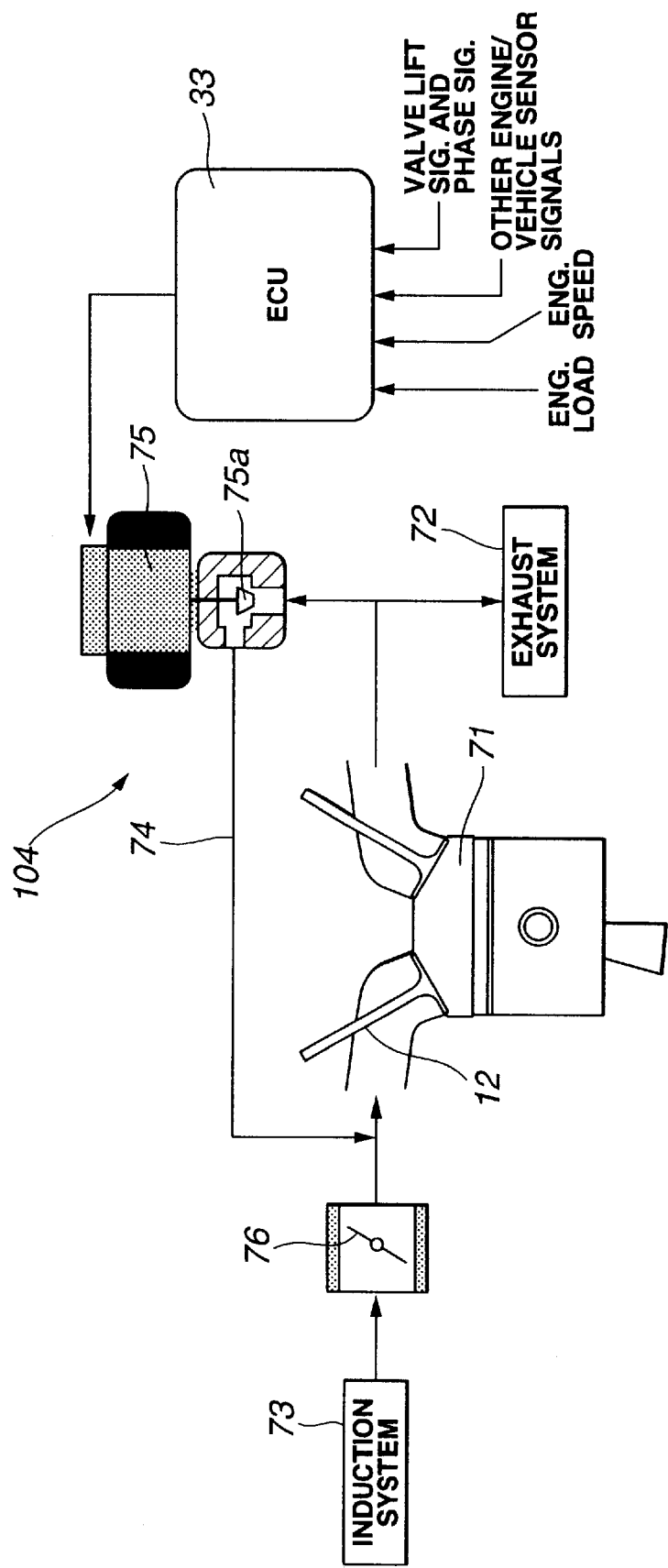
FIG. 14 is a system block diagram of an engine control system equipped with an EGR control system.

To enhance the accuracy of EGR control and to assure a sufficient EGR amount and to effectively reduce fuel consumption, as seen from the system block diagram of FIG. 14, the engine control system of the embodiment employing variable valve operating mechanism 101 and variable compression ratio mechanism 102 may use external EGR in addition to internal EGR. As shown in FIG. 14, in a conventional manner, EGR control system 104 includes EGR passage 74 and EGR control valve 75. EGR passage 74 is provided to intercommunicate an exhaust-valve port of an exhaust system 72 and an intake-valve port of an induction system 73, both communicating a combustion chamber 71. EGR control valve 75 is disposed in EGR passage 74 to open and close the EGR passage. EGR control valve 75 is electronically controlled in response to a control signal from ECU 33. In the shown embodiment, an electromagnetically-operated step motor is used as an actuator for EGR control valve 75. The opening of a valve body 75a of EGR control valve 75 varies depending on the number of angular steps of the step motor. The number of angular steps of the step motor is dependent on the engine/vehicle operating conditions. A component part denoted by reference sign 76 is a throttle valve located in the upstream side of induction system 73. In the system of the embodiment, engine speed is detected by means of a crank angle sensor or a crank position sensor, whereas engine load is detected by means of a throttle-opening sensor that detects a throttle opening of throttle valve 76. Electronic engine control unit ECU 33 generally comprises a microcomputer. ECU 33 includes an input/output interface (I/O), memories (RAM, ROM), and a microprocessor or a central processing unit (CPU). The input/output interface (I/O) of ECU 33 receives input information from various engine/vehicle sensors, namely the crank angle sensor (engine speed sensor), the throttle-opening sensor (engine load sensor), an exhaust-temperature sensor, an engine vacuum sensor, an engine temperature sensor, an engine oil temperature sensor, an accelerator-opening sensor and the like. Although the system of the embodiment uses the throttle opening as engine-load indicative data, in lieu thereof negative pressure in an intake pipe or intake manifold vacuum or a quantity of intake air or a fuel-injection amount may be used as engine load parameters. Within ECU 33, the central processing unit (CPU) allows the access by the I/O interface of input informational data signals from the previously-discussed engine/vehicle sensors. The CPU of ECU 33 is responsible for carrying the integrated engine combustion control program related to variable piston stroke characteristic control (variable compression-ratio $\epsilon$ control), variable intake-valve working angle EA control, variable intake-valve central angle $\phi$ control (variable intake-valve phase control), and external EGR system control stored in memories and is capable of performing necessary arithmetic and logic operations. Computational results (arithmetic calculation results), that is, calculated output signals (drive currents) are relayed via the output interface circuitry of the ECU to output stages, namely, the ignition timing advancer 103, electromagnetic solenoids constructing component parts of first and second hydraulic control modules 32 and 37, electronically-controlled piston-stroke characteristic control actuator 63, and electronically-controlled EGR control valve 75.

Figure 15:
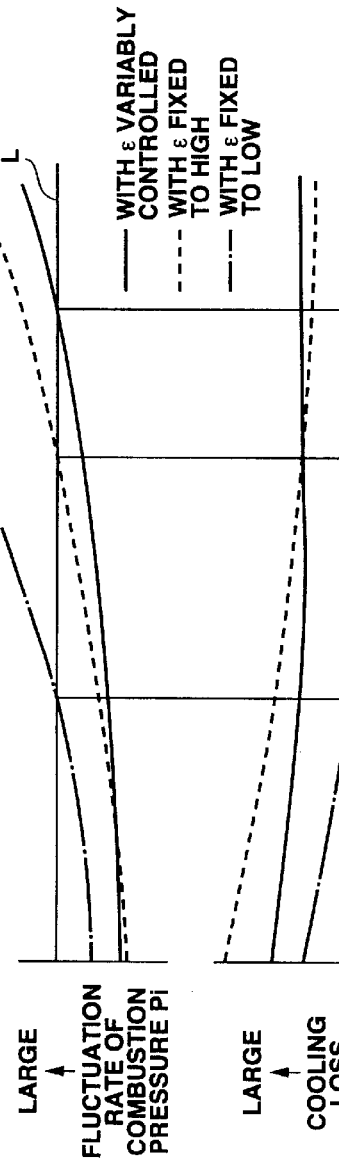
FIGS. 15A, 15B, 15C, 15D, and 15E are time charts showing how the fluctuation rate of combustion pressure Pi, cooling loss, pumping loss, and fuel consumption rate are affected by variations in mechanical compression ratio E in presence of EGR.

FIGS. 15A, 15B, 15C, 15D, and 15E show how the state of combustion (the fluctuation rate of combustion pressure Pi), cooling loss, pumping loss, and fuel consumption rate vary as the EGR rate increases, at three different mechanical compression ratio $\epsilon$ control modes. Characteristic curves indicated by the broken lines in FIGS. 15B–15E are given in the first mechanical compression ratio control mode in which mechanical compression ratio $\epsilon$ is fixed to a predetermined high compression ratio (see the broken line in FIG. 15A). Characteristic curves indicated by the one-dotted lines in FIGS. 15B–15E are given in the second mechanical compression ratio control mode in which mechanical compression ratio $\epsilon$ is fixed to a predetermined low compression ratio (see the one-dotted line in FIG. 15A). Characteristic curves indicated by the solid lines in FIGS. 15B–15E are given in the third mechanical compression ratio control mode in which mechanical compression ratio $\epsilon$ is variably controlled so that mechanical compression ratio $\epsilon$ becomes high as the EGR rate increases (see the solid line in FIG. 15A). Actually, a limit of the fluctuation rate of combustion pressure Pi exists. A horizontal line denoted by L in FIG. 15B is such a limit of the fluctuation rate of combustion pressure Pi. Practically, a point that the fluctuation rate of combustion pressure Pi reaches the limit L corresponds to a limit of the EGR rate. As can be seen from the characteristic curves shown in FIGS. 15B and 15E, when mechanical compression ratio $\epsilon$ is increasingly compensated for responsively to an increase in the EGR rate, the fuel consumption rate reduces and also the limit of the EGR rate is enlarged. In this manner, it is possible to effectively improve fuel economy by gradually controlling mechanical compression ratio $\epsilon$ to a higher value as the EGR rate increases.

FIGS. 16A, 16B, 16C, 16D, and 16E show how the state of combustion (the fluctuation rate of combustion pressure Pi), cooling loss, pumping loss, and fuel consumption rate vary as the EGR rate increases, owing to the presence or absence of the previously-discussed factor (4), i.e., reduced piston velocity near TDC. Characteristic curves shown in FIGS. 16B–16E are obtained on condition that mechanical compression ratio $\epsilon$ is variably controlled such that mechanical compression ratio $\epsilon$ is increasingly compensated for as the EGR rate increases (see the characteristic curve shown in FIG. 16A). Characteristic curves indicated by the solid lines in FIGS. 16B–16E are characteristics of the multi-link type piston-crank mechanism of the embodiment, given in the presence of the factor (4) that the reciprocating motion of piston 58 is approximate to a simple harmonic motion and thus the piston velocity near TDC is properly reduced. On the other hand, characteristic curves indicated by the broken lines in FIGS. 16B–16E are characteristics of the conventional single-link type piston-crank mechanism, given in the absence of the factor (4), that is, the piston velocity near TDC is comparatively fast. As can be seen from comparison between the two characteristic curves shown in FIG. 16C and comparison between the two characteristic curves shown in FIG. 16E, the multi-link type piston-crank mechanism of the embodiment is inferior to the conventional single-link type piston-crank mechanism, with respect to reduced cooling loss and reduced fuel consumption rate. However, a deterioration in fuel consumption rate is slight.

Figure 16:
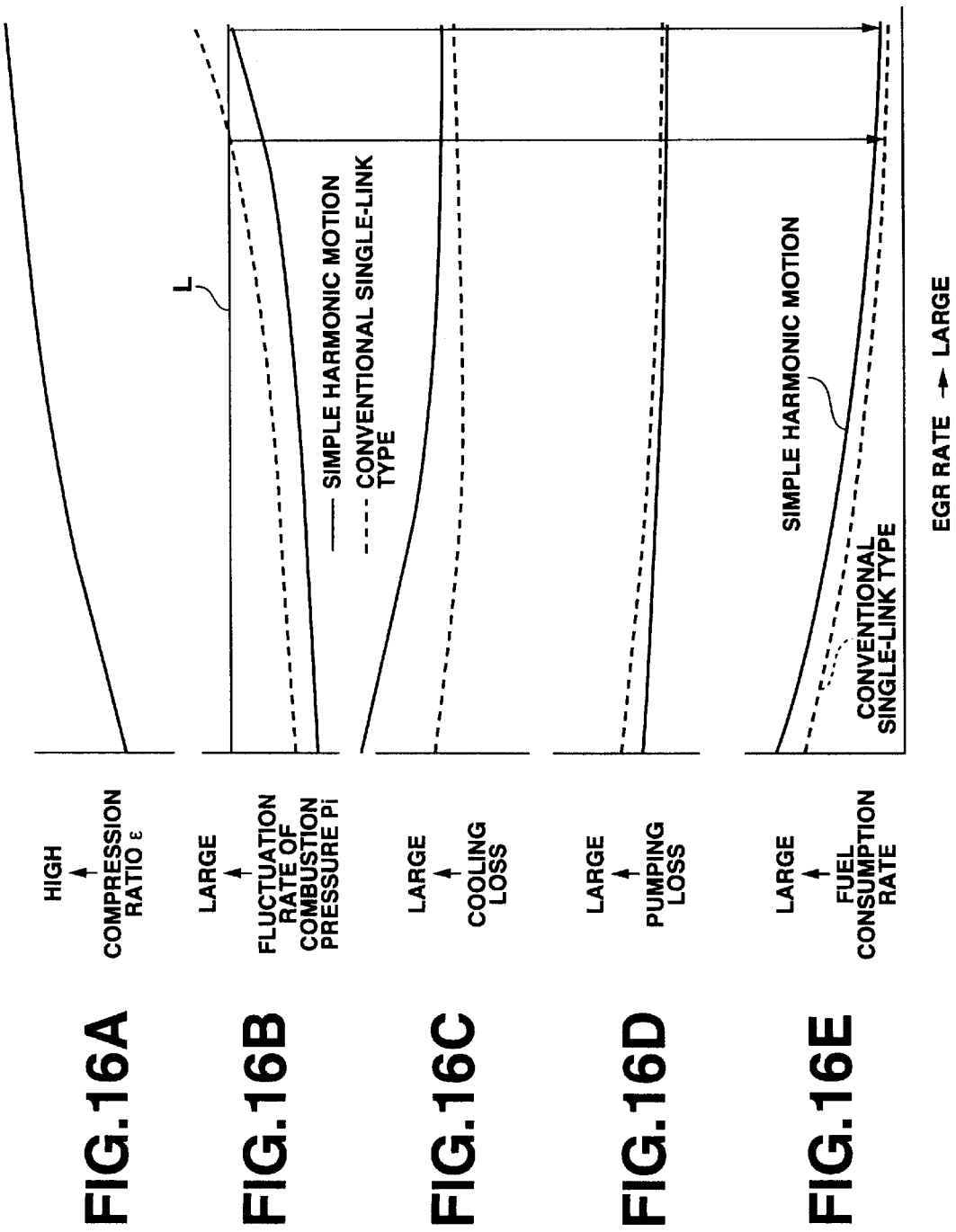
FIGS. 16A, 16B, 16C, 16D, and 16E are time charts showing how the fluctuation rate of combustion pressure Pi, cooling loss, pumping loss, and fuel consumption rate are affected by variations in piston velocity near TDC in presence of EGR.

Additionally, as can be appreciated from comparison between the two characteristic curves shown in FIG. 16B and comparison between the two characteristic curves shown in FIG. 16E, even when the combustion velocity becomes slower due to exhaust-gas recirculated, there is a margin until the fluctuation rate of combustion pressure Pi reaches the limit L, thus permitting the limit of the EGR rate to be enlarged. The enlarged EGR rate increases the cooling-loss reduction effect.

In addition to the above, the engine control system of the embodiment effectively properly uses internal EGR whose amount is based on the valve overlap period and/or external EGR whose amount is based on the opening of EGR control valve 75 of EGR control system 104. External EGR and internal EGR, both acting as inert gas, have the same function that a rise in combustion temperature is effectively suppressed. However, external EGR is different from internal EGR in that temperatures of exhaust gases (combustion gases or burnt gases) induced into the combustion chamber by way of external EGR are considerably different from temperatures of exhaust gases induced into the combustion chamber by way of internal EGR. Although the temperatures of exhaust gases recirculated vary depending on engine operating conditions, generally the temperature of exhaust gas induced into the combustion chamber by way of internal EGR tends to be approximately 500° C. higher than that induced into the combustion chamber by way of external EGR. For this reason, under a specific condition that combustion knock may easily occur in the engine, it is desirable to use external EGR rather than using internal EGR. In particular, in the reciprocating engine equipped with variable compression ratio mechanism 102, if mechanical compression ratio $\epsilon$ is controlled to a high compression ratio and additionally an internal EGR rate is high, there is an increased tendency for the combustion chamber knocking to occur. Thus, under an engine operating condition (for example, in a high compression ratio state) that there is an increased tendency of engine knock, it is desirable to generally use external EGR rather than internal EGR. However, under a particular part load condition properly controlled such that there is a reduced tendency for knocking to occur, the use of internal EGR is desirable from the viewpoint of both reduced combustion deterioration and increased pumping-loss reduction effect. Therefore, during the particular part-load operation it is desirable to increase the internal EGR rate as much as possible.

Figure 17:
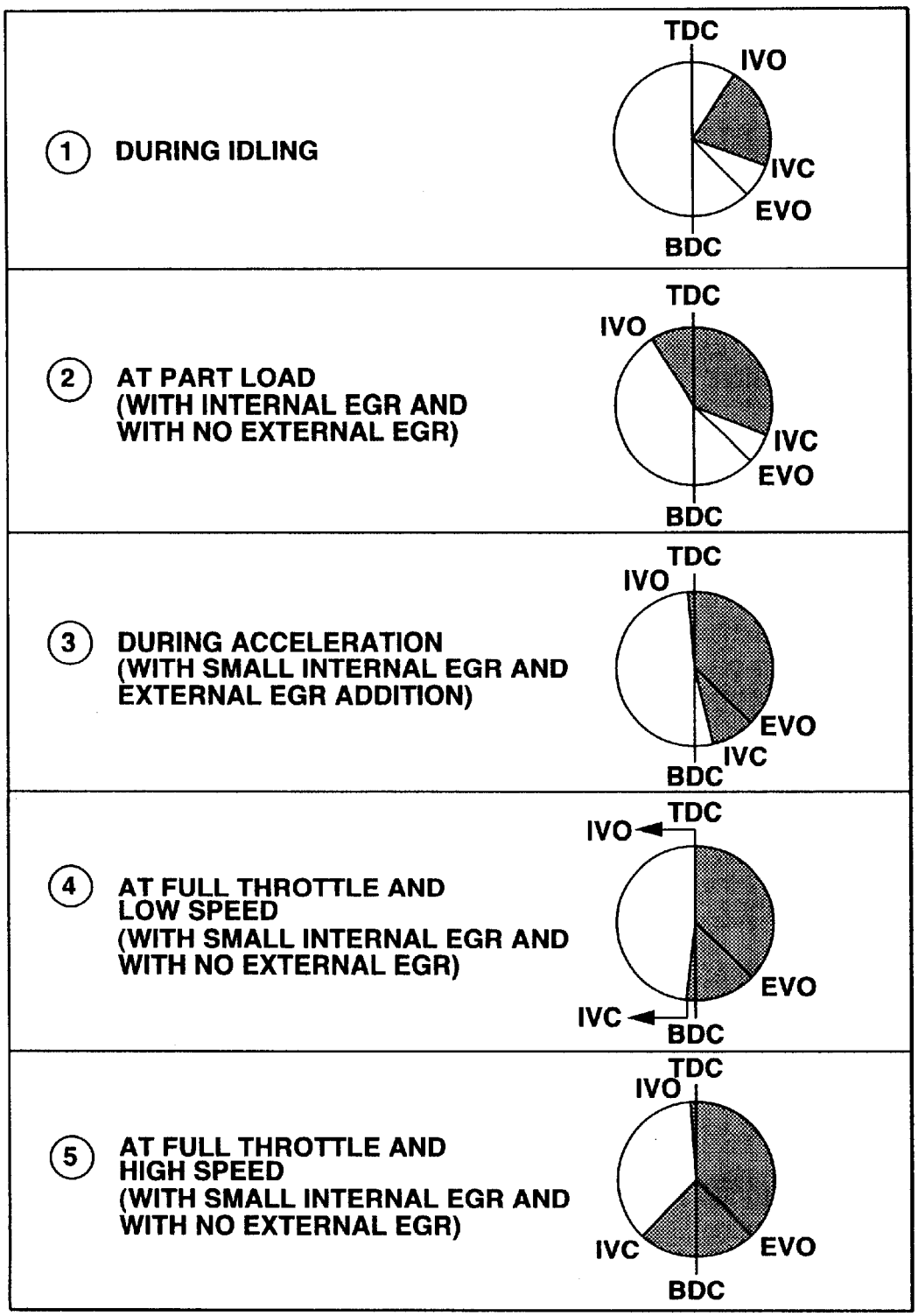
FIG. 17 is an explanatory view showing a valve lift characteristic (IVO, IVC, EA, EVO) of engine valves, performed by the variable valve operating mechanism incorporated in the multi-link type reciprocating engine of the embodiment, under various engine/vehicle operating conditions, in the presence or absence of external EGR and/or internal EGR.
Figure 18:
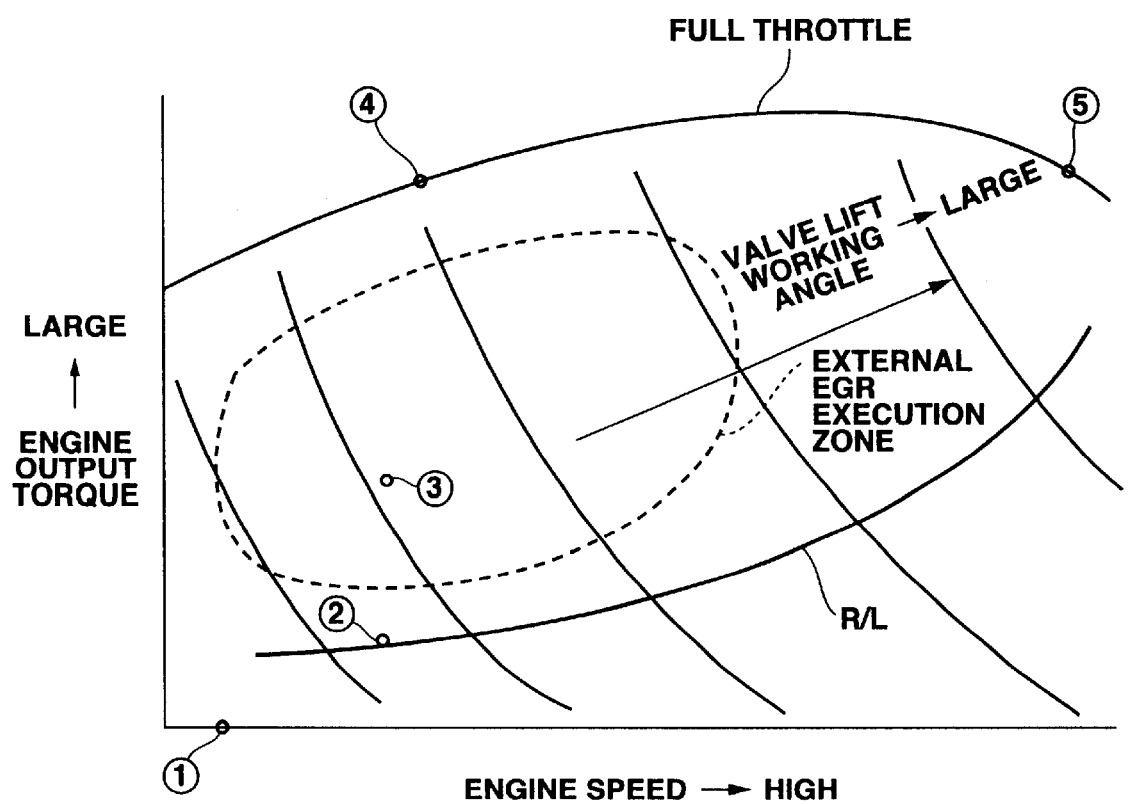
FIG. 18 is a characteristic map showing the relationship between a valve lift characteristic (valve lift and working angle) and an external EGR execution zone under various engine/vehicle operating conditions.
Figure 19:
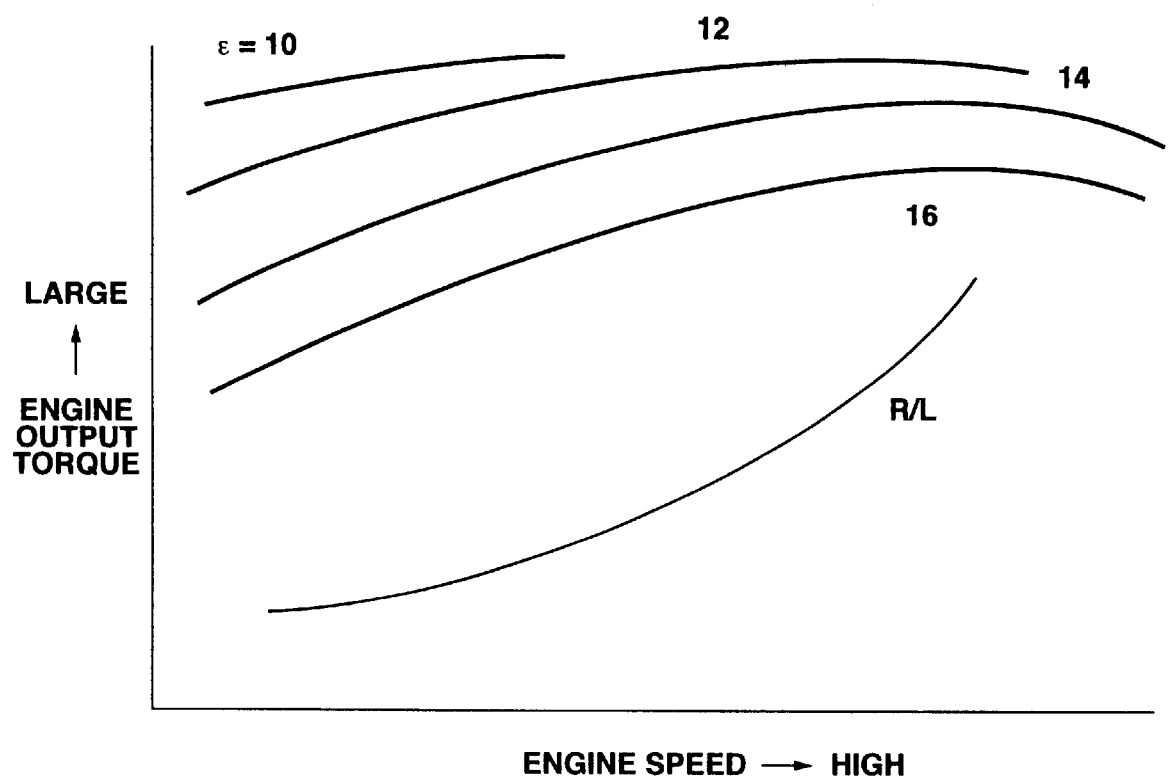
FIG. 19 shows a control characteristic for mechanical compression ratio $\epsilon$ variably controlled by the variable compression ratio mechanism incorporated in the multi-link type reciprocating engine of the embodiment, depending on engine operating conditions.
Figure 20A:
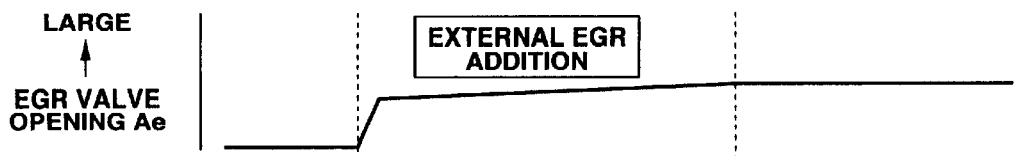
FIGS. 20A, 20B, 20C, 20D, 20E, and 20F are time charts showing variations in the EGR valve opening Ae, throttle opening TVO, intake-valve working angle EA, intake-valve central angle $\phi$, intake valve open timing IVO, and intake valve closure timing IVC, when accelerating from an idling state to a middle acceleration rate after engine warm-up.
Figure 20B:
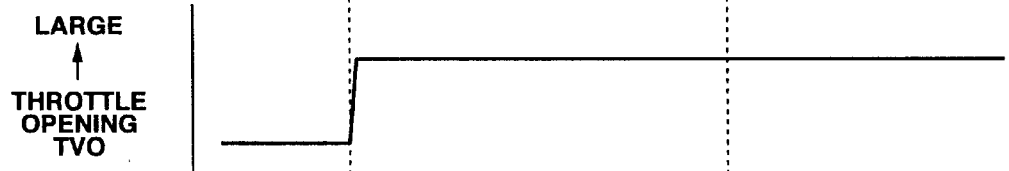
Figure 20C:
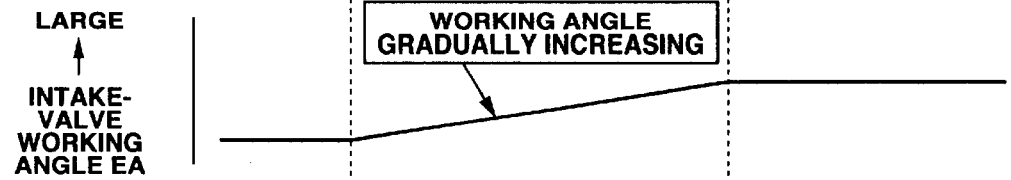
Figure 20D:
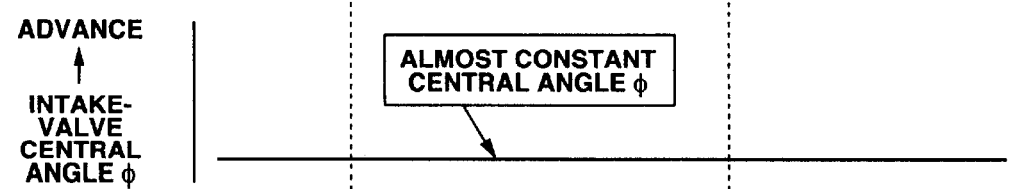
Figure 20E:
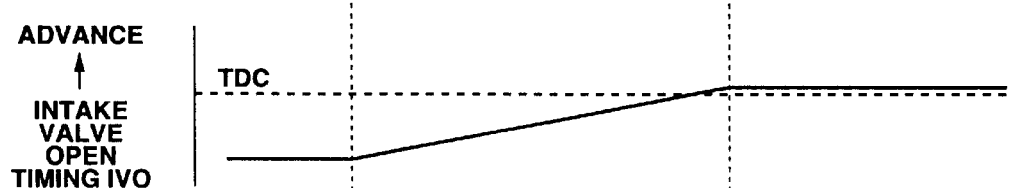
Figure 20F:
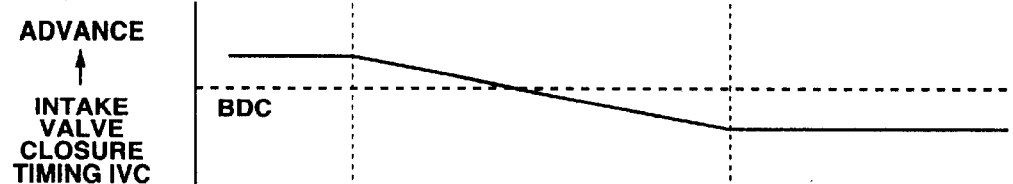

FIG. 17 shows the relationship among intake valve open timing IVO, intake valve closure timing IVC, and the presence or absence of each of internal EGR and external EGR, performed by the multi-link type reciprocating engine of the embodiment, under various engine/vehicle operating conditions, that is, at an idling condition ①, at a part load condition ②, under an acceleration condition ③, under a full throttle and low speed condition ④, and under a full throttle and high speed condition ⑤. On the other hand, FIG. 18 shows the relationship among the magnitude of valve lift, the magnitude of working angle EA, and the external EGR execution zone under various engine/vehicle operating conditions. Note that there is a one-to-one correspondence between the five operating conditions ①, ②, ③, ④, and ⑤ shown in FIG. 17 and the points ①, ②, ③, ④, and ⑤ shown in FIG. 18. FIG. 19 shows characteristic curves of mechanical compression ratio $\epsilon$ variably controlled by variable compression ratio mechanism 102 depending on engine operating conditions, such as engine speed and engine load (engine output torque). As appreciated from the explanatory view of FIG. 17, in a low engine load region except the idling condition ①, such as the part load condition ② (in the R/L region), intake valve open timing IVO is advanced to a timing BTDC (before top dead center) in order to lengthen the valve overlap period and consequently to increase the internal EGR rate. On the other hand, in the part load condition ② (in the R/L region), there is no external EGR. The total amount of exhaust-gas recirculated is completely dependent on the internal EGR. In contrast, in the accelerating region, such as the acceleration condition ③, the full throttle and low speed condition ④ and the full throttle and high speed condition ⑤, intake valve open timing IVO is controlled to a timing near TDC so as to reduce the internal EGR rate. The reduced internal EGR rate contributes to knocking avoidance. In the acceleration conditional ③ wherein the throttle opening TVO is adjusted to a smaller value than that of the full throttle condition ④ or ⑤, external EGR is added to the slight internal EGR, so that part of relatively low temperature burnt gases is recirculated via the EGR control valve to the intake port side. As appreciated from the explanatory view of FIG. 17, the ratio of external EGR to internal EGR tends to decrease as mechanical compression ratio ε decreases.

As shown in FIG. 19, mechanical compression ratio ε is set or controlled to a high compression ratio under the part load condition ② (in the R/L region). Properly speaking, increasing the internal EGR rate under the part load condition ② (in the R/L region) is undesirable from the viewpoint of knocking avoidance. However, as may be appreciated from the explanatory view of FIG. 17, under the part load condition ② the system of the embodiment realizes a valve lift characteristic that the working angle EA of intake valve 12 is reduced and intake valve closure timing IVC is greatly advanced to a timing BBDC (before bottom dead center) on intake stroke. Therefore, the actual compression ratio (effective compression ratio ε') can be effectively lowered, thereby avoiding undesired knocking (in other words, enabling the ratio of internal EGR to external EGR to be increased) and also reducing pumping loss. This highly improves fuel economy. The previously-noted setting of the valve lift characteristic leads to the lowered charging efficiency of intake air, and thus such setting is limited to only the part load condition ② (the R/L region). That is, according to the system of the embodiment, at part-load operation, variable valve operating mechanism 101 advances intake valve closure timing IVC to a timing BBDC (before bottom dead center) on intake stroke, and additionally the ratio of external EGR to internal EGR is extremely decreased responsively to the phase-advance of intake valve closure timing IVC. Actually, as discussed above, during the part load condition, there is no external EGR.

FIGS. 20A, 20B, 20C, 20D, 20E, and 20F show how the EGR valve opening Ae of EGR control valve 75, intake-valve working angle EA, intake-valve central angle φ, intake valve open timing IVO, and intake valve closure timing IVC have to be varied when accelerating from an idling state (corresponding to idling condition ① in FIGS. 17 and 18) to a middle acceleration rate (corresponding to acceleration condition ③ or full throttle and low speed condition ④ in FIGS. 17 and 18) after engine warm-up. As appreciated from the time charts of FIGS. 20A–20F, the valve lift and working angle EA are increased or enlarged (see FIG. 20C), while keeping intake-valve central angle φ substantially constant (see FIG. 20D). On the other hand, intake valve open timing IVO is merely advanced to a timing near TDC (see FIG. 20E), and thus the internal EGR rate is little. In contrast to the little internal EGR, adequate external EGR is achieved by means of EGR control system 104 (see FIG. 20A).

Figure 21A:
FIGS. 21A, 21B, 21C, 21D, 21E, and 21F are time charts showing variations in the EGR valve opening Ae, throttle opening TVO, intake-valve working angle EA, intake-valve central angle $\phi$, intake valve open timing IVO, and intake valve closure timing IVC, when moderately accelerating from an idling state to a slight acceleration rate after engine warm-up.
Figure 21B:
Figure 21C:
Figure 21D:
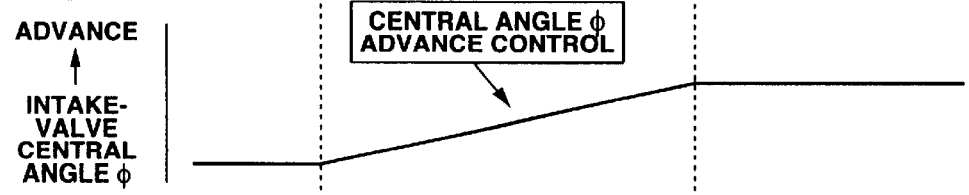
Figure 21E:
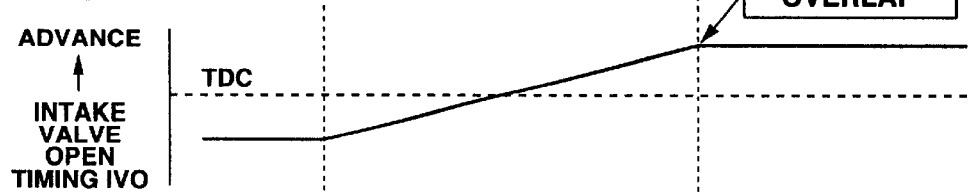
Figure 21F:
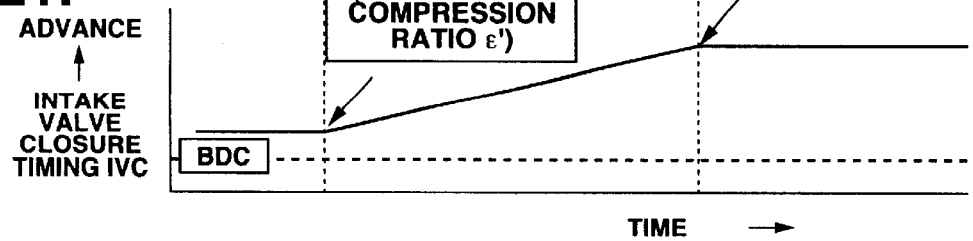
Figure 22A:
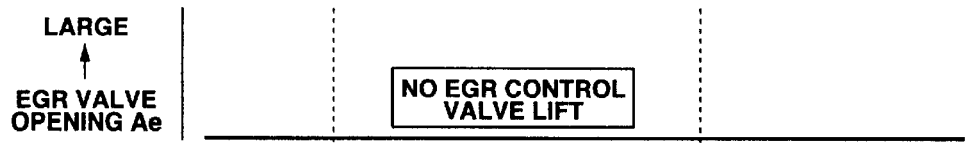
FIGS. 22A, 22B, 22C, 22D, 22E, and 22F are time charts showing variations in the EGR valve opening Ae, throttle opening TVO, intake-valve working angle EA, intake-valve central angle $\phi$, intake valve open timing IVO, and intake valve closure timing IVC, when accelerating from an idling state to a middle acceleration rate with a cold engine.
Figure 22B:
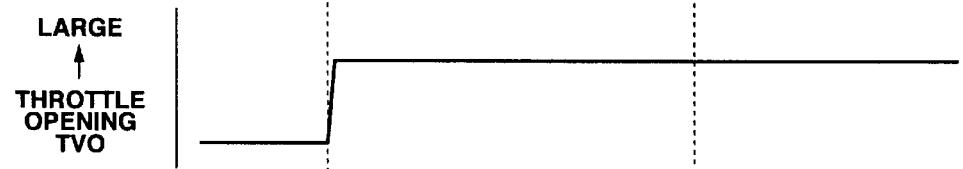
Figure 22C:
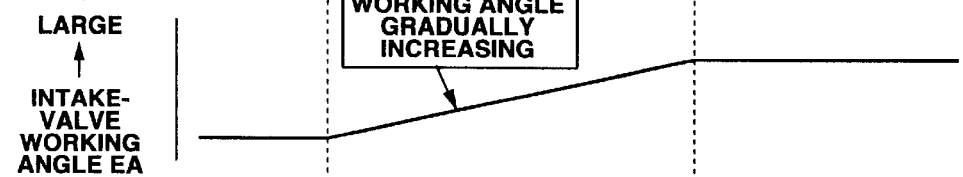
Figure 22D:
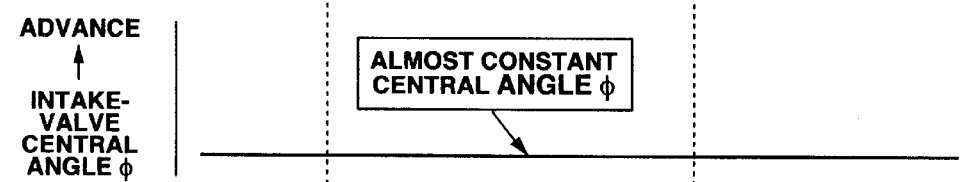
Figure 22E:
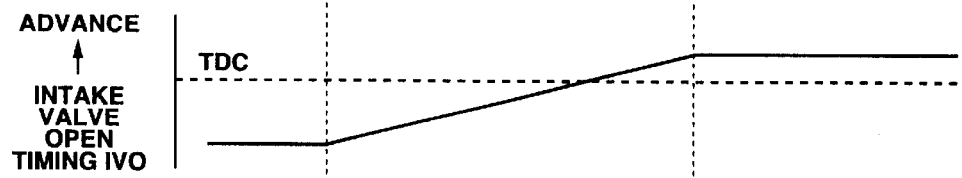
Figure 22F:
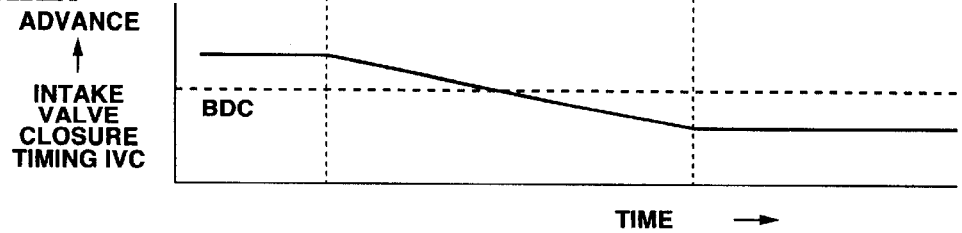

In contrast to the above, FIGS. 21A, 21B, 21C, 21D, 21E, and 21F show how the EGR valve opening Ae of EGR control valve 75, intake-valve working angle EA, intake-valve central angle φ, intake valve open timing IVO, and intake valve closure timing IVC have to be varied when moderately accelerating from an idling state (corresponding to idling condition ① in FIGS. 17 and 18) to a slight acceleration rate (corresponding to part load condition ② in FIGS. 17 and 18) after engine warm-up. As appreciated from the time charts of FIGS. 21A–21F, an increase in each of the valve lift and working angle EA is very little (see FIG. 21C). The phase of intake-valve central angle φ is greatly phase-advanced (see FIG. 21D). Thus, intake valve open timing IVO is advanced to a timing BTDC (before top dead center) so as to enlarge the valve overlap period (see FIG. 21E) and consequently increase the internal EGR rate. EGR control valve 75 of EGR control system 104 is held fully closed and the EGR valve opening Ae is zero (see FIG. 21A) and thus external EGR is not achieved. On the other hand, as shown in FIG. 21F, intake valve closure timing IVC is greatly advanced to a timing BBDC (before bottom dead center), and as a result the actual compression ratio (effective compression ratio ε') can be effectively lowered.

FIGS. 22A, 22B, 22C, 22D, 22E, and 22F show how the EGR valve opening Ae of EGR control valve 75, intake-valve working angle EA, intake-valve central angle φ, intake valve open timing IVO, and intake valve closure timing IVC have to be varied when accelerating from an idling state (corresponding to idling condition ① in FIGS. 17 and 18) to a middle acceleration rate (corresponding to acceleration condition ③ or full throttle and low speed condition ④ in FIGS. 17 and 18) with a cold engine. As is generally known, when the engine is cold, there is a reduced tendency for engine knock to occur, and thus it is possible to increase the ratio of internal EGR to external EGR or to increase the internal EGR rate instead of using external EGR. Induction of higher-temperature exhaust gas into the combustion chamber by way of internal EGR promotes fuel vaporization. For the reasons set forth above, as appreciated from comparison between the two time charts shown in FIGS. 20C (after engine warm-up) and 22C (before engine warm-up), with a cold engine the valve lift and working angle EA are further increased or enlarged (see FIG. 22C) in comparison with those shown in FIG. 20C, while keeping intake-valve central angle φ substantially constant (see FIG. 22D). Therefore, when the engine is cold, intake valve open timing IVO is further advanced (see FIG. 22E) in comparison with the degree of advancement of intake valve open timing IVO (after engine warm-up) shown in FIG. 20E. As a result, the valve overlap period becomes large, thereby increasing the internal EGR rate. At this time (with a cold engine), as can be seen from the timing chart of FIG. 22A, EGR control valve 75 of EGR control system 104 is held fully closed and the EGR valve opening Ae is zero and thus external EGR is not achieved. As appreciated from comparison the time charts of FIGS. 20A (after engine warm-up) and 22A (with a cold engine), the EGR control is executed such that the ratio of external EGR to internal EGR decreases as the engine temperature falls.

As will be appreciated from the above, according to the engine control system of the embodiment, by way of a proper combination of (1) adjustment of mechanical compression ratio ε to high, (2) early intake-valve closing, (3) adequate EGR, and (4) reduced piston velocity near TDC, it is possible to effectively improve fuel economy and to enhance combustion stability at part-load operation. That is, the increased time loss in combustion, occurring due to both (2) early intake-valve closing and (3) adequate EGR, can be cancelled by way of (4) reduced piston velocity near TDC, based on the improved linkage layout of the multi-link type piston-crank mechanism. By further combining these three factors (2), (3), and (4) with the factor (1), that is, adjustment of mechanical compression ratio ε to high, at part-load operation it is possible to remarkably enhance the thermal efficiency and to effectively reduce the fuel consumption rate. Additionally, at part-load operation, the factor (4), that is, reduced piston velocity near TDC, lengthens a high-temperature high-in-cylinder-pressure state and thus ensures stable combustion even during adequate EGR addition.

The entire contents of Japanese Patent Application No. P2002-123366 (filed Apr. 25, 2002) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An engine control system for an internal combustion engine comprising:
   a variable compression ratio mechanism comprising a multi-link type piston-crank mechanism having a plurality of links and enabling a compression ratio of the engine to be varied by changing a piston stroke characteristic by way of a change in an attitude of a part of the links;
   an exhaust-gas recirculation system enabling at least one of external EGR and internal EGR to be controlled;
   the links of the multi-link type piston-crank mechanism being laid out, so that a piston velocity near top dead center, obtained by the multi-link type piston-crank mechanism, is slower than a piston velocity near top dead center, obtained by a single-link type piston-crank mechanism having at least the same piston stroke as the multi-link type piston-crank mechanism;
   during a part load condition of the engine, the variable compression ratio mechanism controlling the compression ratio to a predetermined high compression ratio; and
   during the part load condition, the exhaust-gas recirculation system increasing exhaust-gas recirculation.

2. An engine control system for an internal combustion engine comprising:
   a variable compression ratio mechanism comprising a multi-link type piston-crank mechanism having a plurality of links and enabling a compression ratio of the engine to be varied by changing a piston stroke characteristic by way of a change in an attitude of a part of the links;
   an exhaust-gas recirculation system enabling at least one of external EGR and internal EGR to be controlled;
   the links of the multi-link type piston-crank mechanism being laid out, so that a maximum piston acceleration near top dead center, obtained by the multi-link type piston-crank mechanism, is less than a maximum piston acceleration near bottom dead center, obtained by the multi-link type piston-crank mechanism;
   during a part load condition of the engine, the variable compression ratio mechanism controlling the compression ratio to a predetermined high compression ratio; and
   during the part load condition, the exhaust-gas recirculation system increasing exhaust-gas recirculation.

3. The engine control system as claimed in claim 1, which further comprises:
   a variable valve operating mechanism that variably controls an intake valve open timing and an intake valve closure timing of an intake valve during engine operating conditions; and
   during the part load condition, the variable valve operating mechanism advances the intake valve closure timing to a timing before bottom dead center on intake stroke.

4. The engine control system as claimed in claim 1, wherein:
   the exhaust-gas recirculation system comprises an external exhaust-gas recirculation control system enabling the external EGR to be controlled.

5. The engine control system as claimed in claim 1, which further comprises:
   a variable valve operating mechanism that variably controls an intake valve open timing and an intake valve closure timing of an intake valve during engine operating conditions; and wherein:
   the exhaust-gas recirculation system comprises an internal exhaust-gas recirculation control system enabling the internal EGR to be controlled; the internal exhaust-gas recirculation control system comprising:
      the variable valve operating mechanism that controls the internal EGR by way of a change in a valve overlap period.

6. The engine control system as claimed in claim 1, which further comprises:
   a variable valve operating mechanism that variably controls an intake valve open timing and an intake valve closure timing of an intake valve during engine operating conditions; and wherein:
   the exhaust-gas recirculation system comprises an external exhaust-gas recirculation control system enabling the external EGR to be controlled, and an internal exhaust-gas recirculation control system enabling the internal EGR to be controlled; the internal exhaust-gas recirculation control system comprising:
      the variable valve operating mechanism that controls the internal EGR by way of a change in a valve overlap period.

7. The engine control system as claimed in claim 6, wherein:
   a ratio of the external EGR to the internal EGR decreases as an engine temperature falls.

8. The engine control system as claimed in claim 6, wherein:
   a ratio of the external EGR to the internal EGR decreases as the compression ratio controlled by the variable compression ratio mechanism decreases.

9. The engine control system as claimed in claim 6, wherein:
   during the part load condition, the variable valve operating mechanism advances the intake valve closure timing to a timing before bottom dead center on intake stroke; and
   the ratio of the external EGR to the internal EGR decreases responsively to the phase-advance of the intake valve closure timing during the part load condition.

10. The engine control system as claimed in claim 3, wherein:

the variable valve operating mechanism comprises a variable lift and working angle control mechanism; the variable lift and working angle control mechanism comprises:
  a drive shaft adapted to be rotatably supported on an engine body;
  a first eccentric cam fixedly connected to the drive shaft and driven by the drive shaft;
  a link arm fitted onto an outer periphery of the first eccentric cam and rotating relative to the first eccentric cam;
  a control shaft rotatably supported by the engine body and arranged parallel to the drive shaft, and having a second eccentric cam;
  a rocker arm rotatably supported on the second eccentric cam, an oscillating motion of the rocker arm being caused by the link arm;
  a rockable cam rotatably supported on the drive shaft and being in abutted-engagement with a valve lifter of the intake valve;
  a link member through which the rocker arm and the rockable cam are linked to each other, so that the valve lifter of the intake valve is pushed by an oscillating motion of the rockable cam, occurring due to the oscillating motion of the rocker arm; and
  a valve lift of the intake valve and a working angle of the intake valve are simultaneously continuously changed by changing an angular position of the second eccentric cam.

11. The engine control system as claimed in claim 3, wherein:
  the variable valve operating mechanism comprises a variable phase control mechanism, the variable phase control mechanism comprising:
    a cam sprocket adapted to be driven by a crankshaft;
    a drive shaft adapted to be rotatably supported on an engine body and driven by the cam sprocket; and
    a phase control hydraulic actuator enabling the drive shaft to rotate relative to the cam sprocket for a phase change.

12. The engine control system as claimed in claim 3, wherein:
  the variable valve operating mechanism comprises a variable lift and working angle control mechanism and a variable phase control mechanism;
  the variable lift and working angle control mechanism comprises:
    a drive shaft adapted to be rotatably supported on an engine body;
    a first eccentric cam fixedly connected to the drive shaft and driven by the drive shaft;
    a link arm fitted onto an outer periphery of the first eccentric cam and rotating relative to the first eccentric cam;
    a control shaft rotatably supported by the engine body and arranged parallel to the drive shaft, and having a second eccentric cam;
    a rocker arm rotatably supported on the second eccentric cam, an oscillating motion of the rocker arm being caused by the link arm;
    a rockable cam rotatably supported on the drive shaft and being in abutted-engagement with a valve lifter of the intake valve;
    a link member through which the rocker arm and the rockable cam are linked to each other, so that the valve lifter of the intake valve is pushed by an oscillating motion of the rockable cam, occurring due to the oscillating motion of the rocker arm; and
    a valve lift of the intake valve and a working angle of the intake valve are simultaneously continuously changed by changing an angular position of the second eccentric cam;
  the variable phase control mechanism comprising:
    a cam sprocket adapted to be driven by a crankshaft;
    the drive shaft adapted to be rotatably supported on the engine body and driven by the cam sprocket; and
    a phase control hydraulic actuator enabling the drive shaft to rotate relative to the cam sprocket for a phase change.

13. The engine control system as claimed in claim 1, wherein:
  the variable compression ratio mechanism comprises:
    a first link connected at one end via a piston pin to a reciprocating piston;
    a second link oscillatingly linked to the other end of the first link and rotatably linked to a crankpin of a crankshaft; and
    a third link oscillatingly supported at one end on an engine body and oscillatingly connected at the other end to the second link, so that the compression ratio is variably controlled by changing a center of oscillating motion of the third link.

14. An engine control system for an internal combustion engine comprising:
  variable compression ratio means comprising a multi-link type piston-crank mechanism having a plurality of links that enable a compression ratio of the engine to be varied by changing a piston stroke characteristic by way of a change in an attitude of a part of the links;
  exhaust-gas recirculation means for enabling at least one of external EGR and internal EGR to be controlled;
  the links of the multi-link type piston-crank mechanism being laid out, so that a piston velocity near top dead center, obtained by the multi-link type piston-crank mechanism, is slower than a piston velocity near top dead center, obtained by a single-link type piston-crank mechanism having at least the same piston stroke as the multi-link type piston-crank mechanism;
  during a part load condition of the engine, the variable compression ratio means controlling the compression ratio to a predetermined high compression ratio; and
  during the part load condition, the exhaust-gas recirculation means increasing exhaust-gas recirculation.

15. The engine control system as claimed in claim 14, wherein:
  the links of the multi-link type piston-crank mechanism are laid out, so that a maximum piston acceleration near top dead center, obtained by the multi-link type piston-crank mechanism, is less than a maximum piston acceleration near bottom dead center, obtained by the multi-link type piston-crank mechanism.

16. The engine control system as claimed in claim 15, which further comprises:
  variable valve operating means that variably controls an intake valve open timing and an intake valve closure timing of an intake valve during engine operating conditions; and
  during the part load condition, the variable valve operating means advances the intake valve closure timing to a timing before bottom dead center on intake stroke.

17. The engine control system as claimed in claim 16, wherein:
  the exhaust-gas recirculation means comprises at least one of an external exhaust-gas recirculation control system enabling the external EGR to be controlled, and an internal exhaust-gas recirculation control system enabling the internal EGR to be controlled; the internal exhaust-gas recirculation control system comprising:

the variable valve operating means that controls the internal EGR by way of a change in a valve overlap period.

18. The engine control system as claimed in claim 17, wherein:

a ratio of the external EGR to the internal EGR decreases as an engine temperature falls.

19. The engine control system as claimed in claim 17, wherein:

a ratio of the external EGR to the internal EGR decreases as the compression ratio controlled by the variable compression ratio means decreases.

20. The engine control system as claimed in claim 17, wherein:

the ratio of the external EGR to the internal EGR decreases responsively to the phase-advance of the intake valve closure timing during the part load condition.

* * * * *